US012337596B2

(12) United States Patent
Tabata et al.

(10) Patent No.: US 12,337,596 B2
(45) Date of Patent: Jun. 24, 2025

(54) LIQUID EJECTION SYSTEM

(71) Applicant: SEIKO EPSON CORPORATION, Tokyo (JP)

(72) Inventors: Kunio Tabata, Shiojiri (JP); Noritaka Ide, Shiojiri (JP); Dai Nozawa, Matsumoto (JP); Rika Tanimoto, Matsumoto (JP); Yukihiro Hanaoka, Shiojiri (JP)

(73) Assignee: SEIKO EPSON CORPORATION (JP)

(*) Notice: Subject to any disclaimer, the term of this patent is extended or adjusted under 35 U.S.C. 154(b) by 171 days.

(21) Appl. No.: 18/453,462

(22) Filed: Aug. 22, 2023

(65) Prior Publication Data

US 2024/0066859 A1 Feb. 29, 2024

(30) Foreign Application Priority Data

Aug. 23, 2022 (JP) ................................. 2022-132303

(51) Int. Cl.
*B41J 2/045* (2006.01)

(52) U.S. Cl.
CPC ......... *B41J 2/04548* (2013.01); *B41J 2/0457* (2013.01); *B41J 2/04581* (2013.01)

(58) Field of Classification Search
CPC .. B41J 2/04548; B41J 2/0457; B41J 2/04581; B41J 2/04541; B41J 2/04593; B41J 2/04596; B41J 2/04573; B41J 2/04513; B41J 2/04515; B41J 2/0452; B41J 2/04525; B41J 2/04555
See application file for complete search history.

(56) References Cited

U.S. PATENT DOCUMENTS

2002/0171694 A1 11/2002 Takayanagi
2019/0381791 A1* 12/2019 Goto ...................... C09D 11/54
2021/0135476 A1* 5/2021 Shimamura ........ H04N 1/00907
2021/0213756 A1* 7/2021 Odajima .............. B41J 2/17523

FOREIGN PATENT DOCUMENTS

JP 2002-321347 A 11/2002
JP 2004-034455 A 2/2004
JP 2013-166293 A 8/2013
JP 2013-166294 A 8/2013
JP 2013-239060 A 11/2013

* cited by examiner

*Primary Examiner* — Kristal Feggins
(74) *Attorney, Agent, or Firm* — Harness, Dickey & Pierce, P.L.C.

(57) ABSTRACT

A liquid ejection system includes a first head unit and a second head unit. The first head unit includes a first determining circuit that determines whether a first power supply voltage is normal, a first drive circuit that outputs a first drive signal based on the first power supply voltage, and a first ejecting head that ejects liquid The second head unit includes a second determining circuit that determines whether a second power supply voltage is normal, a second drive circuit that outputs a second drive signal based on the second power supply voltage, and a second ejecting head that ejects liquid When the first determining circuit determines that the first power supply voltage is not normal, or when the second determining circuit determines that the second power supply voltage is not normal, the first ejecting head and the second ejecting head stop ejecting the liquid.

10 Claims, 12 Drawing Sheets

| | | LD | MD | SD | ND |
|---|---|---|---|---|---|
| [SIH,SIL] | | [1,1] | [1,0] | [0,1] | [0,0] |
| S | T1 | H | H | L | L |
| | T2 | H | L | H | L |
| | T3 | L | L | L | H |

LIQUID EJECTION SYSTEM

The present application is based on, and claims priority from JP Application Serial Number 2022-132303, filed Aug. 23, 2022, the disclosure of which is hereby incorporated by reference herein in its entirety.

BACKGROUND

1. Technical Field

The present disclosure relates to a liquid ejection system.

2. Related Art

As a liquid ejecting apparatus that ejects liquid onto a medium to form a desired image on the medium, a liquid ejecting apparatus is known, which operates with power supplied by USB bus power through a USB cable compliant with the Universal Serial Bus (USB) communication standard. Since the USB bus power is compliant with the USB standard, the amount of power supplied by the USB bus power is limited. Meanwhile, the amount of power consumed by the liquid ejecting apparatus significantly varies according to an operational state of the liquid ejecting apparatus. Therefore, when the liquid ejecting apparatus operates with power supplied by the USB bus power, the amount of power supplied according to the operational state of the liquid ejecting apparatus is unstable, and as a result, there is a possibility that the accuracy of the ejection of liquid may decrease. Regarding such a liquid ejecting apparatus that operates with power supplied by USB bus power, JP-A-2013-166293 discloses a liquid ejecting apparatus that can monitor a state of power supply by USB bus power and perform an appropriate operation according to the state of the power supply.

In response to a recent request for improvement of the quality of an image to be formed on a medium, a liquid ejection system in which a plurality of liquid ejecting apparatuses (head units) are coupled to each other has been developed. However, JP-A-2013-166293 does not describe an operation of a liquid ejection system when the amount of power supplied to the liquid ejection system is unstable, and thus there is room for improvement.

SUMMARY

According to an aspect of the present disclosure, a liquid ejection system includes a first head unit that ejects liquid onto a medium, and a second head unit that ejects liquid onto the medium. The first head unit includes a first USB connector to which a first power supply voltage is input, a second USB connector from which a second power supply voltage based on the first power supply voltage is output, a first determining circuit that determines whether the first power supply voltage is normal, a first drive circuit that outputs a first drive signal based on the first power supply voltage, a first ejecting head that ejects the liquid when the first drive signal is supplied to the first ejecting head, and a first casing housing the first USB connector, the second USB connector, the first determining circuit, the first drive circuit, and the first ejecting head in a state in which at least a portion of the first USB connector and at least a portion of the second USB connector are exposed from the first casing. The second head unit includes a third USB connector to which the second power supply voltage is input, a second determining circuit that determines whether the second power supply voltage is normal, a second drive circuit that outputs a second drive signal based on the second power supply voltage, a second ejecting head that ejects the liquid when the second drive signal is supplied to the second ejecting head, and a second casing housing the third USB connector, the second determining circuit, the second drive circuit, and the second ejecting head in a state in which at least a portion of the third USB connector is exposed from the second casing. When the first determining circuit determines that the first power supply voltage is not normal, or when the second determining circuit determines that the second power supply voltage is not normal, the first ejecting head and the second ejecting head stop ejecting the liquid.

DESCRIPTION OF EMBODIMENTS

Hereinafter, embodiments of the present disclosure are described with reference to the drawings. The drawings used are for convenience of explanation. The embodiments described below do not unduly limit the content of the present disclosure described in the claims. In addition, not all of configurations described below are necessarily essential in the present disclosure.

In the following description, an X axis, a Y axis, and a Z axis that are perpendicular to each other and are illustrated in some of the drawings are used for explanation. The origin side of an arrow on the X axis illustrated in each of the drawings may be referred to as a −X side, and the tip side of the arrow on the X axis illustrated in each of the drawings may be referred to as a +X side. The origin side of an arrow on the Y axis illustrated in each of the drawings may be referred to as a −Y side, and the tip side of the arrow on the Y axis illustrated in each of the drawings may be referred to as a +Y side. The origin side of an arrow on the Z axis illustrated in each of the drawings may be referred to as a −Z side, and the tip side of the arrow on the Z axis illustrated in each of the drawings may be referred to as a +Z side.

1. Outline of Liquid Ejection System

Figure 1:
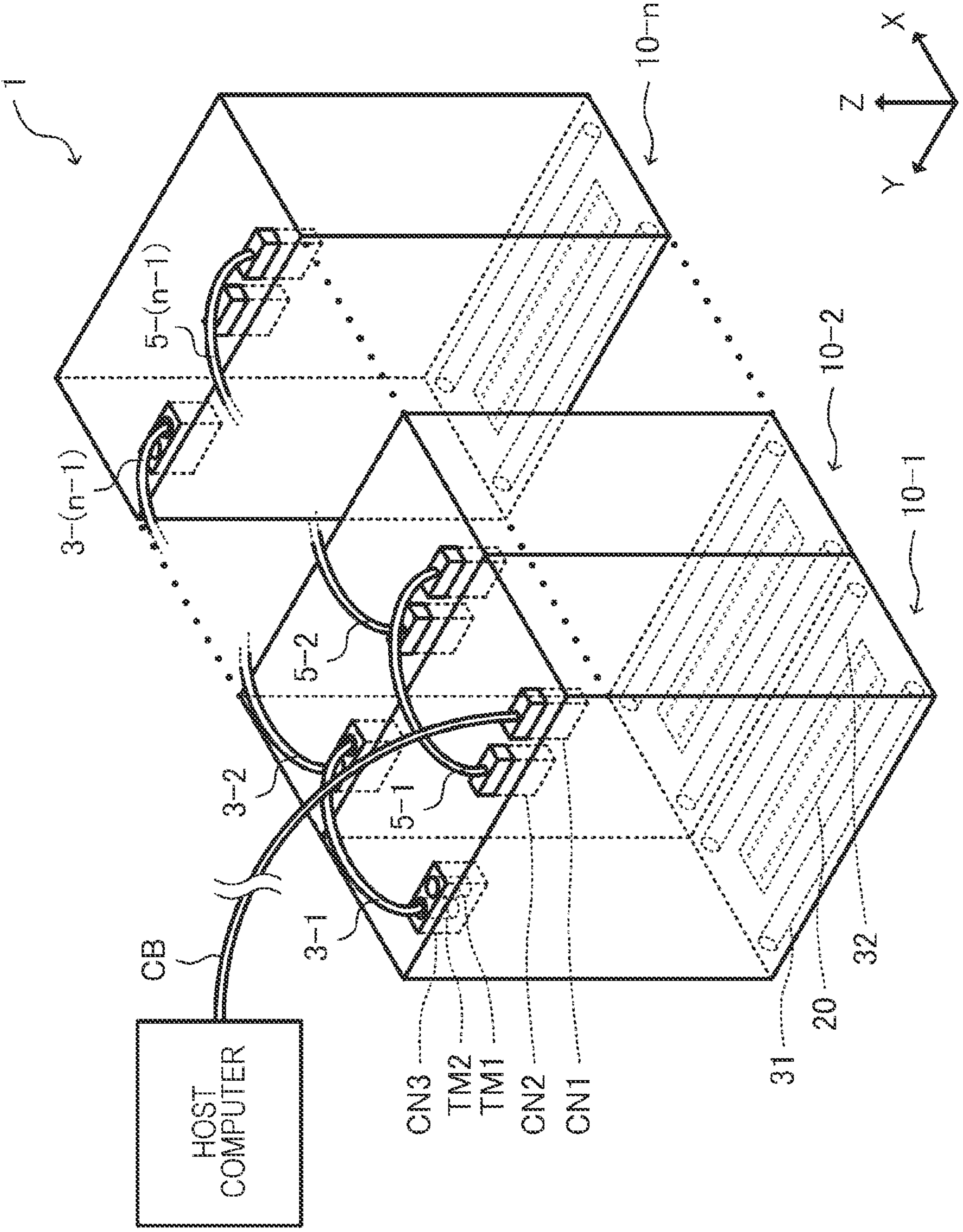
FIG. 1 is a diagram illustrating an example of a configuration of a liquid ejection system.

FIG. 1 is a diagram illustrating an example of a configuration of a liquid ejection system 1. As illustrated in FIG. 1, the liquid ejection system 1 includes head units 10-1 to **10-*n*, cables 3-1 to 3**-(*n*−1), and cables 5-1 to 5-(*n*−1). The liquid ejection system 1 is driven by a drive voltage supplied from a host computer such as a personal computer, a tablet, or a smartphone and forms, on a medium, an image according to image data input to the liquid ejection system 1 from the host computer.

The head units 10-1 to **10-*n* are arranged side by side along the X axis in the order of the head units 10-1, 10-2, . . . , and 10-*n* from the −X side to the +X side. In this case, the head units 10-1, 10-2, . . . , and 10-*n*** are fixed to each other by fixing jigs or the like not illustrated.

Each of the head units 10-1, 10-2, . . . , and **10-*n* includes rollers 31 and 32, an ejecting head 20, and connectors CN1, CN2, and CN3**.

The rollers 31 are disposed such that rotational axes of the rollers 31 extend in a direction along the Y axis in a state in which at least portions of the rollers 31 are exposed from surfaces of the head units 10-1, 10-2, . . . , and **10-*n* on the −Z side. The rollers 32 are located on the +X side of the rollers 31 and are disposed such that rotational axes of the rollers 32 extend in the direction along the Y axis in a state in which at least portions of the rollers 32 are exposed from the surfaces of the head units 10-1, 10-2, . . . , and 10-*n* on the −Z side. The ejecting heads 20 are located between the rollers 31 and the rollers 32 in a direction along the X axis and eject ink onto the medium in a state in which at least portions of the ejecting heads 20 are exposed from the surfaces of the head units 10-1, 10-2, . . . , and 10-*n*** on the −Z side. The ink is an example of liquid.

The connectors CN1 and CN2 are arranged side by side along the Y axis in the order of the connectors CN1 and CN2 from the −Y side to the +Y side in a state in which at least portions of the connectors CN1 and CN2 are exposed from surfaces of the head units 10-1, 10-2, . . . , and **10-*n* on the +Z side. One end of a cable CB is coupled to the connector CN1 included in the head unit 10-1. The other end of the cable CB is electrically coupled to the host computer such as a personal computer, a tablet, or a smartphone. One end of the cable 5-1 is coupled to the connector CN2 included in the head unit 10-1. While the other end of the cable 5-1 is coupled to the connector CN1 included in the head unit 10-2, one end of the cable 5-2 is coupled to the connector CN2 included in the head unit 10-2. Similarly, while the other end of the cable 5**-(*i*−1) (i is any of 2 to n−1) is coupled to the connector CN1 included in the head unit **10-*i*, one end of the cable 5-*i* is coupled to the connector CN2 included in the head unit 10-*i*. The other end of the cable 5**-(*n*−1) is coupled to the connector CN1 included in the head unit **10-*n*. In this case, the connector CN2 included in the head unit 10-*n* is in an open state as illustrated in FIG. 1. The head unit 10-*n* may not include the connector CN2**.

That is, the head unit 10-1 is electrically coupled to the head unit 10-2 by coupling the connector CN2 included in the head unit 10-1 to the connector CN1 included in the head unit 10-2 via the cable 5-1. The head unit **10-*i* is electrically coupled to the head unit 10**-(*i*+1) by coupling the connector CN2 included in the head unit **10-*i* to the connector CN1 included in the head unit 10**-(*i*+1) via the cable **5-*i***.

The image data and the drive voltage are input to the connector CN1 of the head unit 10-1 from the host computer through the cable CB. The head unit 10-1 operates based on the input image data and the drive voltage and outputs the input image data and the drive voltage from the connector CN2. The image data and the drive voltage output by the head unit 10-1 are input to the connector CN1 of the head unit 10-2 through the cable 5-1. The head unit 10-2 operates based on the input image data and the drive voltage and outputs the input image data and the drive voltage from the connector CN2. Similarly, the image data and the drive voltage output by the head unit 10-(*i*−1) are input to the connector CN1 of the head unit **10-*i* through the cable 5**-(*i*−1). The head unit **10-*i* operates based on the input image data and the drive voltage and outputs the input image data and the drive voltage from the connector CN2. The image data and the drive voltage output by the head unit 10**-(*n*−1) are input to the connector CN1 of the head unit **10-*n* through the cable 5**-(*n*−1). The head unit **10-*n*** operates based on the input image data and the drive voltage.

That is, the head units 10-1 to **10-*n* are coupled to each other in series via the cables 5-1 to 5**-(*n*−1). The image data and the drive voltage output by the host computer are input to the head unit 10-1, transferred through the head unit 10-1 and the cable 5-1, input to the head unit 10-2, transferred to the head 10-2 and the cable 5-2, . . . , input to the head unit 10-(*n*−1), transferred through the head unit 10-(*n*−1) and the cable 5-(*n*−1), and input to the head unit **10-*n*. As the cables CB and 5-1 to 5**-(*n*−1), USB cables compliant with the Universal Serial Bus (USB) standard are preferably used. As the connectors CN1 and CN2, USB receptacle connectors to which the USB cables can be attached are preferably used. Therefore, the head units 10-1 to **10-*n* can be coupled to each other via a single cable. This reduces the possibility that the configuration of the liquid ejection system 1** may be complex.

That is, the head unit 10-1 includes the connector CN1 that is compliant with the USB standard and to which the drive voltage is input, and the connector CN2 that is compliant with the USB standard and from which the drive voltage is output. The drive voltage output by the host computer is input to the connector CN1 included in the head unit 10-1. In addition, each of the head units 10-2 to 10-(*n*−1) includes the connector CN1 that is compliant with the USB standard and to which the drive voltage is input, and the connector CN2 that is compliant with the USB standard and from which the drive voltage is output. The drive voltage output by the head unit 10-(*i*−1) is input to the connector CN1 included in the head unit **10-*i*. In addition, the head unit 10-*n* includes the connector CN1 that is compliant with the USB standard and to which the drive voltage is input, and the drive voltage output by the head unit 10**-(*n*−1) is input to the connector CN1 included in the head unit **10-*n***.

The connectors CN3 are located on the +Y side of the connectors CN1 and CN2 and disposed such that at least portions of the connectors CN3 are exposed from the surfaces of the head units 10-1, 10-2, . . . , and **10-*n* on the +Z side. Each of the connectors CN3 included in the head units 10-1 to 10-*n* is coupled to corresponding one or two of the cables 3-1 to 3**-(*n*−1). Therefore, the head units 10-1 to **10-*n*** are coupled to each other.

Specifically, each of the connectors CN3 included in the head units 10-1 to **10-*n* includes terminals TM1 and TM2. One end of the cable 3-1 is coupled to the terminal TM2 included in the head unit 10-1. While the other end of the cable 3-1 is coupled to the terminal TM1 included in the head unit 10-2, one end of the cable 3-2 is coupled to the terminal TM2 included in the head unit 10-2. Similarly, while the other end of the cable 3**-(*i*−1) is coupled to the terminal TM1 included in the head unit 10-*i*, one end of the cable 3-*i* is coupled to the terminal TM2 included in the head unit 10-*i*. The other end of the cable 3-(*n*−1) is coupled to the terminal TM1 included in the head unit 10-*n*. In this case, each of the terminal TM1 included in the head unit 10-1 and the terminal TM2 included in the head unit 10-*n* is in an open state as illustrated in FIG. 1. The connector CN3 of the head unit 10-1 may not include the terminal TM1, and the connector CN3 of the head unit 10-*n* may not include the terminal TM2.

As described above, the head unit 10-1 is electrically coupled to the head unit 10-2 by coupling the terminal TM2 included in the head unit 10-1 to the terminal TM1 included in the head unit 10-2 via the cable 3-1. The head unit 10-*i* is electrically coupled to the head unit 10-(*i*+1) by coupling the terminal TM2 included in the head unit 10-*i* to the terminal TM1 included in the head unit 10-(*i*+1) via the cable 3-*i*. That is, the head units 10-1 to 10-*n* are electrically coupled to each other via the cables 3-1 to 3-(*n*−1). In the liquid ejection system 1 according to the present embodiment, since the head units 10-1 to 10-*n* are electrically coupled to each other via the cables 3-1 to 3-(*n*−1), the head units 10-1 to 10-*n* share abnormality information indicating an abnormality that occurred in any of the head units 10-1 to 10-*n*, specifically, information indicating whether the drive voltage in each of the head units 10-1 to 10-*n* is normal. A method for sharing the abnormality information is described later in detail.

When a user manually moves, along the X axis, the head units 10-1 to 10-*n* included in the liquid ejection system 1 according to the present embodiment, the rollers 31 and 32 rotate and the ejecting heads 20 eject ink in an amount according to the image data at a timing according to the rotational amounts of the rollers 31 and 32. Therefore, the liquid ejection system 1 forms an image according to the image data on the medium. That is, the liquid ejection system 1 according to the present embodiment constitutes a handy printer including the head units 10-1 to 10-*n*.

In the liquid ejection system 1 according to the present embodiment, the head units 10-1 to 10-*n* are coupled to each other in a single row in the direction extending along the X axis and orthogonal to the rotational axes of the rollers 31 and 32 as an example. However, some of the head units 10-1 to 10-*n* may be arranged side by side in the direction along the Y axis and coupled to each other. As illustrated in FIG. 1, since the head units 10-1 to 10-*n* are arranged side by side in a single row in the direction along the X axis, the liquid ejection system 1 can increase the resolution of an image to be formed on the medium. Meanwhile, when some of the head units 10-1 to 10-*n* are coupled to each other in the direction along the Y axis, and the user manually operates and moves the liquid ejection system 1 along the X axis, the liquid ejection system 1 can form an image in a wide range of the medium and the printing speed of the liquid ejection system 1 can be increased. That is, in the liquid ejection system 1 according to the present embodiment that includes the head units 10-1 to 10-*n*, the head units 10-1 to 10-*n* can be coupled to each other in any arrangement. Therefore, the highly versatile liquid ejection system 1 can be provided according to the use of the liquid ejection system 1 by the user.

2. Outline of Head Units

Next, configurations of the head units 10-1 to 10-*n* constituting the liquid ejection system 1 are described below in detail. The configurations of the head units 10-1 to 10-*n* are the same. Therefore, in the following description, when the head units 10-1 to 10-*n* are not distinguished, the head units 10-1 to 10-*n* may be merely referred to as head units 10.

2.1. Structure of Each Head Unit

Figure 2:
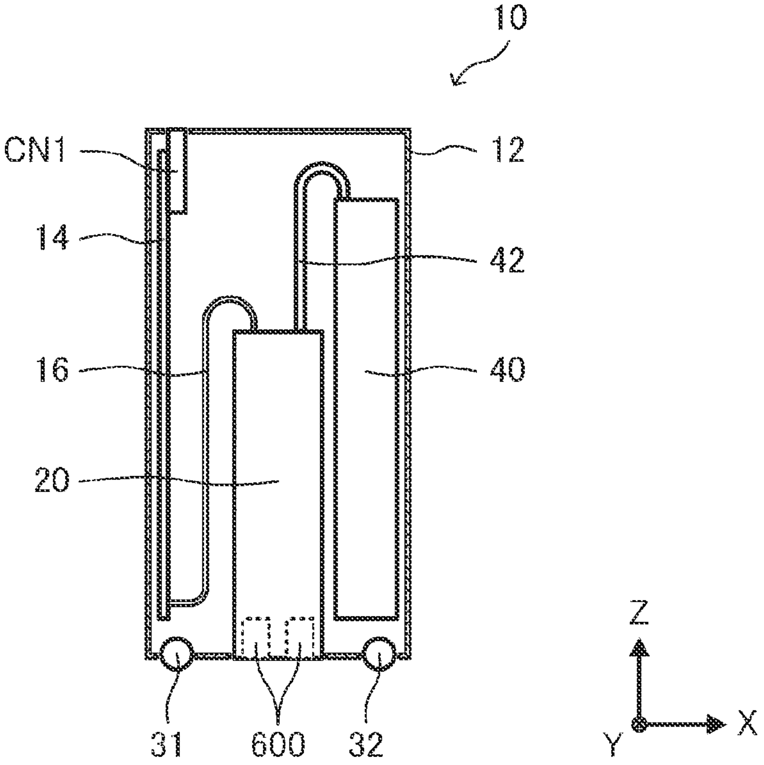
FIG. 2 is a diagram illustrating an example of an internal structure of a head unit.

First, a structure of each of the head units 10 is described in detail. FIG. 2 is a diagram illustrating an example of the internal structure of the head unit 10. As illustrated in FIG. 2, the head unit 10 includes a casing 12 a wiring substrate 14, an ejecting head 20, an ink container 40, and the rollers 31 and 32. The wiring substrate 14, the ejecting head 20, the ink container 40, and the rollers 31 and 32 are housed in the casing 12.

The roller 31 is disposed such that the rotational axis of the roller 31 extends in the direction along the Y axis in a state in which at least a portion of the roller 31 is exposed from the surface of the casing 12 on the −Z side. The roller 32 is located on the +X side of the roller 31 and disposed such that the rotational axis of the roller 32 extends in the direction along the Y axis in a state in which a portion of the roller 32 is exposed from the surface of the casing 12 on the −Z side. The rollers 31 and 32 rotate when the user manually moves the head unit 10 in the direction along the X axis.

The wiring substrate 14 is a plate-shaped member extending along a surface of the casing 12 on the −X side. On the wiring substrate 14, not only the connectors CN1, CN2, and CN3 described above, but also various circuits for controlling an operation of the ejecting head 20 based on the image data and rotational amounts of the rollers 31 and 32 are mounted. In the following description, the head unit 10 includes the single wiring substrate 14, but may include a plurality of wiring substrates 14.

The ink container 40 is located along a surface of the casing 12 on the +X side. The ink container 40 stores ink to be ejected from the ejecting head 20 and supplies the stored ink to the ejecting head 20. The ink container 40 configured in this manner may be an ink cartridge, a bag-shaped ink pack formed of a flexible film, or an ink tank that can be refilled with ink.

The ejecting head 20 is located between the wiring substrate 14 and the ink container 40 in the direction along the X axis. The ejecting head 20 includes a plurality of ejecting units 600 that eject the ink onto the medium. The ejecting head 20 is disposed such that the plurality of ejecting units 600 are exposed from a region included in the surface of the casing 12 on the −Z side and located between the roller 31 and the roller 32.

Figure 3:
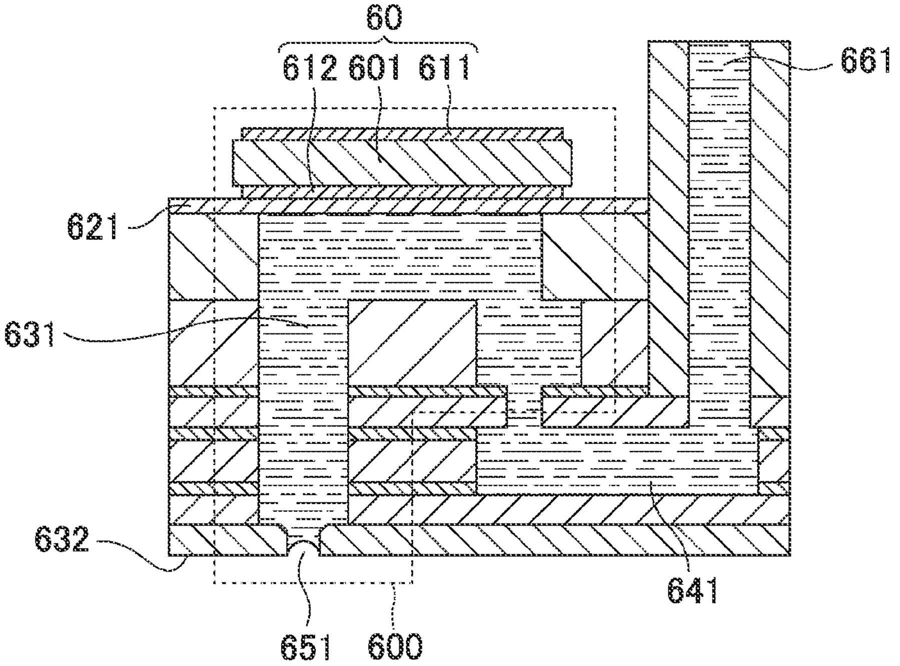
FIG. 3 is a diagram illustrating an example of a schematic structure of one of a plurality of ejecting units.

An example of a structure of each of the ejecting units 600 included in the ejecting head 20 is described below. FIG. 3 is a diagram illustrating an example of a schematic structure of one of the ejecting units 600. FIG. 3 illustrates a reservoir 641 provided in common for the plurality of ejecting units 600, and a supply port 661 for supplying ink into the reservoir 641, in addition to the ejecting unit 600.

As illustrated in FIG. 3, the ejecting unit 600 includes a piezoelectric element 60, a vibration plate 621, a cavity 631, and a nozzle plate 632.

The piezoelectric element 60 includes a piezoelectric body 601 and electrodes 611 and 612. In the piezoelectric element 60, the electrodes 611 and 612 are located so as to sandwich the piezoelectric body 601. The piezoelectric element 60 configured in this manner is driven according to a potential difference between a voltage supplied to the electrode 611 and a voltage supplied to the electrode 612 such that a central portion of the piezoelectric body 601 deforms in a vertical direction.

The vibration plate 621 is located beneath the piezoelectric element 60 as illustrated in FIG. 3. That is, the piezoelectric element 60 is formed on an upper surface of the vibration plate 621 as illustrated in FIG. 3. The vibration plate 621 deforms in the vertical direction as the piezoelectric element 60 is driven to deform in the vertical direction.

The cavity 631 is located under the vibration plate 621 as illustrated in FIG. 3. The cavity 631 communicates with the reservoir 641. Therefore, the ink supplied from the ink container 40 through the supply port 661 is supplied into the cavity 631 through the reservoir 641. The internal volume of the cavity 631 changes due to the deformation of the vibration plate 621 in the vertical direction. That is, the vibration plate 621 functions as a diaphragm for changing the internal volume of the cavity 631, and the cavity 631 functions as a pressure chamber in which internal pressure changes due to the deformation of the vibration plate 621.

The nozzle plate 632 has a nozzle 651 formed therein. The nozzle 651 is an opening formed in the nozzle plate 632 and communicating with the cavity 631. The ink supplied to the cavity 631 is ejected from the nozzle 651 according to a change in the internal volume of the cavity 631.

In the ejecting unit 600 configured in this manner, when the piezoelectric element 60 is driven to bend upward, the vibration plate 621 deforms upward, and thus the internal volume of the cavity 631 increases and the ink stored in the reservoir 641 is drawn into the cavity 631. On the other hand, when the piezoelectric element 60 is driven to bend downward, the vibration plate 621 deforms downward, and thus the internal volume of the cavity 631 decreases and the ink in an amount corresponding to the decrease in the internal volume of the cavity 631 is ejected from the nozzle 651. It suffices for the piezoelectric element 60 to be driven to eject the ink from the nozzle 651, and the piezoelectric element 60 is not limited to have the structure illustrated in FIG. 3.

Figure 4:
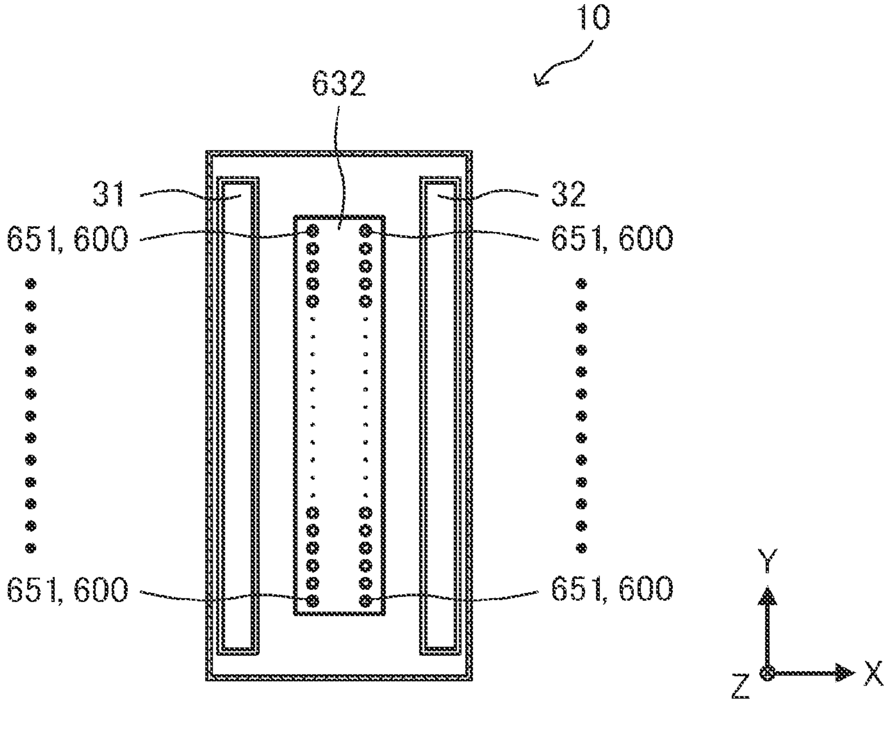
FIG. 4 is a diagram illustrating the head unit as viewed from a −Z side in a direction along a Z axis.

FIG. 4 is a diagram illustrating the head unit 10 as viewed from the −Z side in a direction along the Z axis. As illustrated in FIG. 4, the nozzles 651 included in the ejecting units 600 included in the ejecting head 20 are arranged in two rows in the direction along the Y axis. That is, the ejecting head 20 is disposed such that the nozzles 651 arranged in the two rows are exposed from a region included in the surface of the casing 12 on the −Z side and located between the roller 31 and the roller 32. FIG. 4 illustrates a case where the positions of the plurality of nozzles 651 arranged in one of the two rows in the direction along the Y axis are substantially the same as the positions of the plurality of nozzles 651 arranged in the other of the two rows in the direction along the Y axis. However, the positions of the plurality of nozzles 651 arranged in the one of the two rows in the direction along the Y axis may be different from the positions of the plurality of nozzles 651 arranged in the other of the two rows in the direction along the Y axis. That is, the nozzles 651 included in the ejecting head 20 and arranged in the two rows may be arranged in a so-called zigzag pattern. In this case, it is possible to increase the resolution of an image to be formed on the medium.

Returning to FIG. 2, the ink stored in the ink container 40 is supplied to the ejecting head 20 through an ink supply tube 42. The ink supplied to the ejecting head 20 is supplied to the plurality of ejecting units 600 through the ink supply port 661. In addition, signals generated by various circuits mounted on the wiring substrate 14 are input to the ejecting head 20 through a flexible cable 16. The ejecting head 20 drives the piezoelectric elements 60 at a timing defined by a signal input to the ejecting head 20 through the flexible cable 16. By driving the piezoelectric elements 60, the ink stored in the cavities 631 of the ejecting units 600 is ejected from the nozzles 651.

In each of the head units according to the present embodiment, the casing 12 houses the wiring substrate 14 on which the connectors CN1, CN2, and CN3 are mounted, the ejecting head 20 that ejects ink, and the ink container 40 in a state in which at least a portion of the connector CN1, at least a portion of the connector CN2, and a portion of the connector CN3 are exposed from the casing 12. The user manually moves the casings 12 in the direction along the X axis so as to rotate the rollers 31 and 32, and circuits mounted on the wiring substrates 14 output signals for controlling operations of the ejecting heads 20 to the ejecting heads 20 at a timing according to the rotations of the rollers 31 and 32. As a result, the ejecting heads 20 eject ink according to a movement state in which the user manually moves the casings 12 in the direction along the X axis.

2.2. Functional Configuration of Each Head Unit

Figure 5:
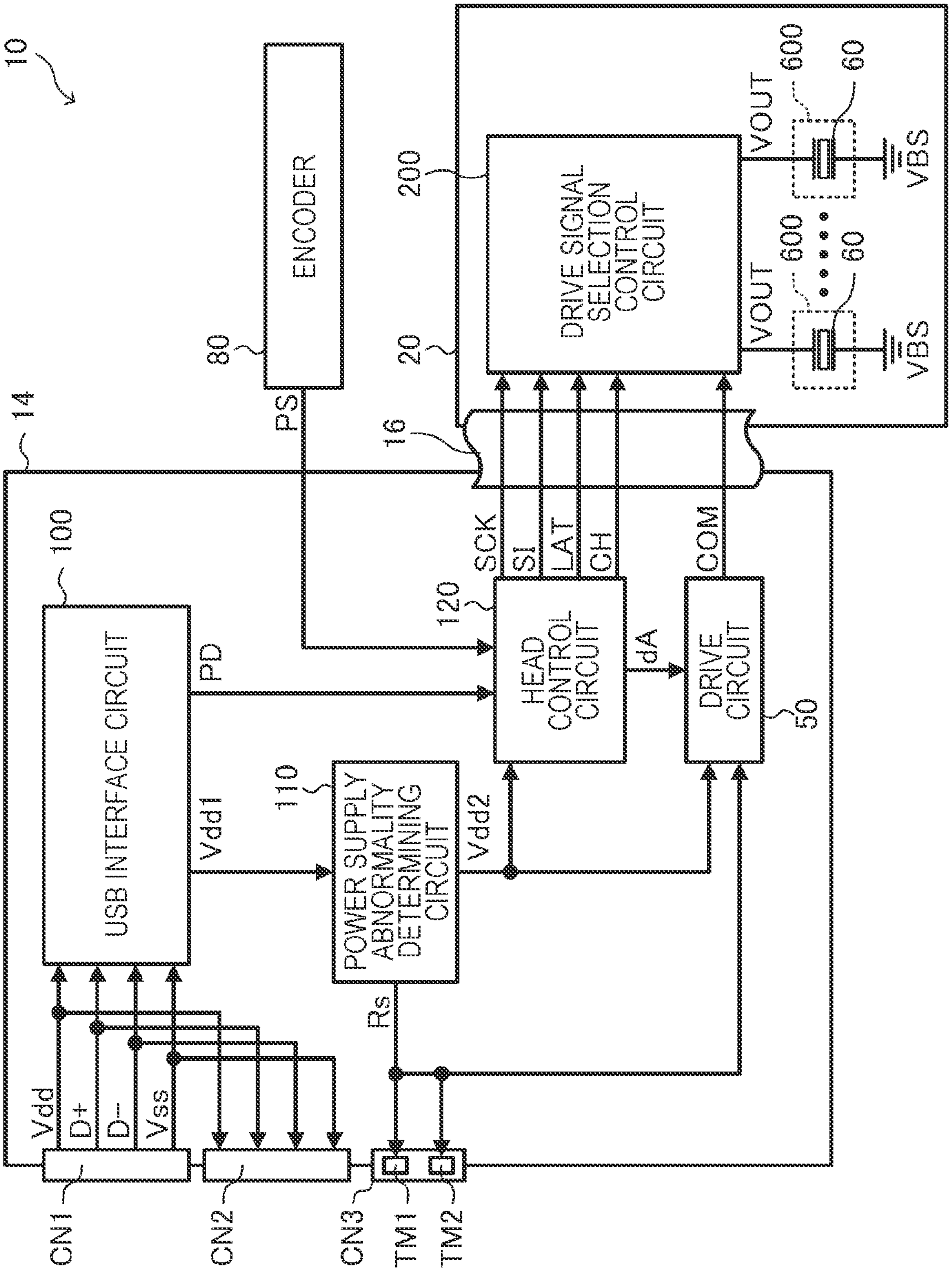
FIG. 5 is a diagram illustrating an example of a functional configuration of the head unit.

Next, a functional configuration of each of the head units 10 is described. FIG. 5 is a diagram illustrating an example of the functional configuration of the head unit 10. As described above, the head unit 10 includes the wiring substrate 14, the ejecting head 20, and the flexible cable 16 electrically coupling the wiring substrate 14 to the ejecting head 20. The head unit 10 also includes an encoder 80 that detects rotational amounts of the rollers 31 and 32 and outputs a positional information signal PS according to the rotational amounts.

The connectors CN1, CN2, and CN3, a USB interface circuit 100, a power supply abnormality determining circuit 110, a head control circuit 120, and a drive circuit 50 are mounted on the wiring substrate 14.

A voltage signal Vdd, a ground signal Vss, and differential signals D+ and D− including address information and the image data are input to the USB interface circuit 100 through the connector CN1. The voltage signal Vdd, the ground signal Vss, and the differential signals D+ and D− input through the connector CN1 are branched by the wiring substrate 14. Thereafter, the voltage signal Vdd, the ground signal Vss, and the differential signals D+ and D− are output from the connector CN2. Then, the head unit 10 is driven based on a potential difference between the voltage signal Vdd and the ground signal Vss input through the connector CN1. That is, the voltage signal Vdd corresponds to a drive voltage for driving the head unit 10, the ground signal Vss corresponds to a ground potential of the head unit 10, and power consumed by the head unit 10 driven by the voltage signal Vdd corresponds to power for driving the head unit 10. In this case, the ground signal Vss corresponds to the ground potential of the head unit 10 as described above. The ground signal Vss is input to the USB interface circuit 100 and supplied to various circuits of the head unit 10 including the USB interface circuit 100.

The USB interface circuit 100 restores the input differential signals D+ and D− to a single-end signal and generates the image data corresponding to the head unit 10 based on the address information included in the restored signal. Thereafter, the USB interface circuit 100 generates image information PD from the generated image data and outputs the generated image information PD to the head control circuit 120. In addition, the USB interface circuit 100 outputs the input voltage signal Vdd as a voltage signal Vdd1 to the power supply abnormality determining circuit 110. The USB interface circuit 100 includes one or multiple semiconductor devices.

In the head unit 10 according to the present embodiment, the voltage signal Vdd, the ground signal Vss, and the differential signals D+ and D− input through the connector CN1 are branched by the wiring substrate 14, one of the branched voltage signals Vdd, one of the branched ground signal Vss, and one pair of the branched differential signals D+ and D− are input to the USB interface circuit 100, and the other of the branched voltage signals Vdd, the other of the branched ground signal Vss, and the other pair of the branched differential signals D+ and D− are output from the connector CN2. However, the voltage signal Vdd, the ground signal Vss, and the differential signals D+ and D− input through the connector CN1 may be input to the USB interface circuit 100 without being branched, and thereafter, the USB interface circuit 100 may output the voltage signal Vdd, the ground signal Vss, and the differential signals D+ and D− to be output from the connector CN2, the image information PD to be input to the head control circuit 120, and the voltage signal Vdd1 to be input to the power supply abnormality determining circuit 110.

The power supply abnormality determining circuit 110 determines whether the voltage signal Vdd1 input from the USB interface circuit 100 is normal. Thereafter, the power supply abnormality determining circuit 110 generates a determination result signal Rs including a result of the determination and outputs the generated determination result signal Rs. The determination result signal Rs generated by the power supply abnormality determining circuit 110 is output to the terminals TM1 and TM2 included in the connector CN3 and is input to the drive circuit 50. In addition, the power supply abnormality determining circuit 110 outputs the input voltage signal Vdd1 as a voltage signal Vdd2 to the head control circuit 120 and the drive circuit 50. That is, the power supply abnormality determining circuit 110 determines whether the voltage signals Vdd1 and Vdd2 are normal. Thereafter, the determination result signal Rs indicating a result of the determination by the power supply abnormality determining circuit 110 as to whether the voltage signals Vdd1 and Vdd2 are normal is output from the terminals TM1 and TM2. In other words, the head unit 10 includes the terminals TM1 and TM2 from which the determination result signal Rs indicating the result of the determination by the power supply abnormality determining circuit 110 as to whether the voltage signals Vdd1 and Vdd2 are normal is output. A configuration and an operation of the power supply abnormality determining circuit 110 are described later in detail.

The voltage signal Vdd2 output by the power supply abnormality determining circuit 110, the image information PD output by the USB interface circuit 100, and the positional information signal PS output by the encoder 80 are input to the head control circuit 120.

The head control circuit 120 operates with the input voltage signal Vdd2 as a drive power supply to generate a clock signal SCK, a print data signal SI, a latch signal LAT, a change signal CH, and a base drive signal dA based on the input image information PD and holds the clock signal SCK, the print data signal SI, the latch signal LAT, the change signal CH, and the base drive signal dA. Thereafter, the head control circuit 120 outputs the held clock signal SCK, the held print data signal SI, the held latch signal LAT, and the held change signal CH to the ejecting head 20 and outputs the base drive signal dA to the drive circuit 50 at a timing when the head control circuit 120 is synchronized with the positional information signal PS output by the encoder 80. The head control circuit 120 includes one or multiple semiconductor devices including a holding region for holding the generated clock signal SCK, the generated print data signal SI, the generated latch signal LAT, the generated change signal CH, and the generated base drive signal dA.

The voltage signal Vdd2 and the determination result signal Rs output by the power supply abnormality determining circuit 110, and the base drive signal dA output by the head control circuit 120 are input to the drive circuit 50. When the input determination result signal Rs indicates that the voltage signals Vdd1 and Vdd2 are normal, the drive circuit 50 generates a drive signal COM based on the base drive signal dA and the voltage signal Vdd2 and outputs the generated drive signal COM to the ejecting head 20. That is, the drive circuit 50 outputs the drive signal COM based on the voltage signal Vdd2. On the other hand, when the input determination result signal Rs indicates that at least one of the voltage signals Vdd1 and Vdd2 is abnormal, the drive circuit 50 stops at least one of the generation and output of the drive signal COM. A configuration and an operation of the drive circuit 50 are described later in detail.

The ejecting head 20 includes a drive signal selection control circuit 200 and the plurality of ejecting units 600.

The clock signal SCK, the print data signal SI, the latch signal LAT, and the change signal CH output by the head control circuit 120, and the drive signal COM output by the drive circuit 50 are input to the drive signal selection control circuit 200. The drive signal selection control circuit 200 generates drive signals VOUT corresponding to the ejecting units 600 by selecting or unselecting a signal waveform included in the drive signal COM based on the input clock signal SCK, the input print data signal SI, the input latch signal LAT, and the input change signal CH, and outputs the drive signals VOUT to the corresponding ejecting units 600. A configuration and an operation of the drive signal selection control circuit 200 are described later in detail.

As described above, each of the ejecting units 600 includes the piezoelectric element 60 including the piezoelectric body 601 and the electrodes 611 and 612. The corresponding drive signal VOUT is supplied to one end of the piezoelectric element 60, for example, to the electrode 611. A reference voltage signal VBS is supplied to the other end of the piezoelectric element 60, for example, to the electrode 612. The piezoelectric element 60 is driven according to a potential difference between a voltage value of the drive signal VOUT supplied to the electrode 611 and a voltage value of the reference voltage signal VBS supplied to the electrode 612. As a result, ink in an amount corresponding to an amount by which the piezoelectric element 60 is driven is ejected from the nozzle 651 of the corresponding ejecting unit 600. That is, the ejecting head 20 ejects the ink when the drive signal COM is supplied to the ejecting head 20. The reference voltage signal VBS supplied to the other end of the piezoelectric element 60, for example, to the electrode 612 may have the same voltage value as that of the ground signal Vss or may be a direct-current voltage signal having a fixed voltage value of 5.5 V, 6V, or the like. The reference voltage signal VBS functions as a reference potential for driving each of the piezoelectric elements 60.

Figure 6:
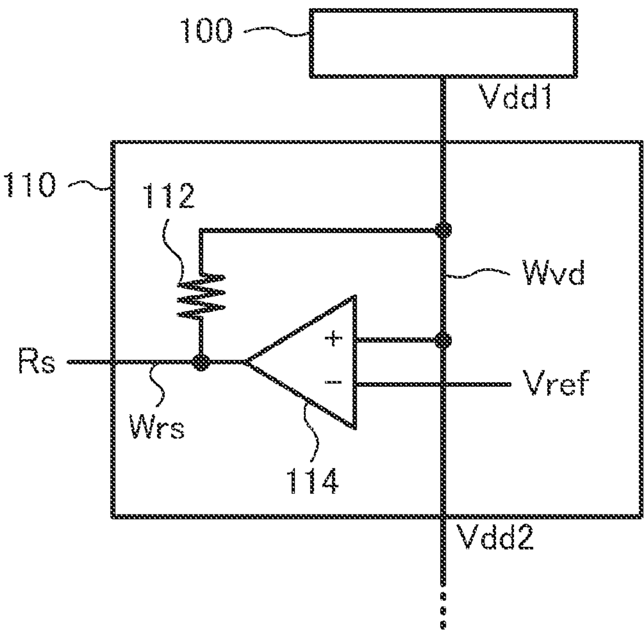
FIG. 6 is a diagram illustrating an example of a functional configuration of a power supply abnormality determining circuit.

2.3. Functional Configuration of Each Power Supply Abnormality Determining Circuit Next, a configuration and an operation of each of the power supply abnormality determining circuits 110 included in the head units 10 are described. FIG. 6 is a diagram illustrating an example of a functional configuration of the power supply abnormality determining circuit 110. As illustrated in FIG. 6, the power supply abnormality determining circuit 110 includes wirings Wvd and Wrs, a resistive element 112, and a comparator 114.

The voltage signal Vdd1 input to the power supply abnormality determining circuit 110 is transferred through the wiring Wvd and output as the voltage signal Vdd2. One end of the resistive element 112 is electrically coupled to the wiring Wvd, and the other end of the resistive element 112 is electrically coupled to the wiring Wrs. A positive-side input terminal of the comparator 114 is electrically coupled to the wiring Wvd. A voltage signal Vref functioning as a reference voltage is input to a negative-side input terminal of the comparator 114. An output terminal of the comparator 114 is electrically coupled to the wiring Wrs. The power supply abnormality determining circuit 110 outputs a voltage value of the wiring Wrs as a determination result signal Rs. In other words, the determination result signal Rs is transferred through the wiring Wrs.

In the power supply abnormality determining circuit 110 configured in the above-described manner, the comparator 114 compares a voltage value of the signal transferred through the wiring Wvd and input to the positive-side input terminal with a voltage value of the voltage signal Vref input to the negative-side input terminal. The output terminal of the comparator 114 is switched to high impedance or the ground potential according to a result of comparing the voltage value of the signal transferred through the wiring Wvd with the voltage value of the voltage signal Vref.

In the power supply abnormality determining circuit 110 configured in the above-described manner, when the voltage value of the signal transferred through the wiring Wvd is equal to or larger than the voltage value of the voltage signal Vref, that is, when voltage values of the voltage signals Vdd1 and Vdd2 are equal to or larger than the voltage value of the voltage signal Vref, the comparator 114 sets the impedance of the output terminal to the high impedance. In this case, a signal that has the voltage value of the signal transferred through the resistive element 112 and the wiring Wvd, that is, has the voltage values of the voltage signals Vdd1 and Vdd2 is supplied to the wiring Wrs electrically coupled to the output terminal of the comparator 114. Therefore, when the voltage values of the voltage signals Vdd1 and Vdd2 are equal to or larger than the voltage value of the voltage signal Vref, the power supply abnormality determining circuit 110 outputs a determination result signal Rs having the voltage value of the signal transferred through the wiring Wvd.

On the other hand, when the voltage value of the signal transferred through the wiring Wvd is smaller than the voltage value of the voltage signal Vref, that is, when at least one of the voltage values of the voltage signals Vdd1 and Vdd2 is smaller than the voltage value of the voltage signal Vref, the comparator 114 sets the output terminal to the ground potential. As a result, the potential of the wiring Wrs electrically coupled to the output terminal of the comparator 114 is set to the ground potential. That is, when at least one of the voltage values of the voltage signals Vdd1 and Vdd2 is smaller than the voltage value of the voltage signal Vref, the power supply abnormality determining circuit 110 outputs a determination result signal Rs at the ground potential.

As described above, the power supply abnormality determining circuit 110 compares the voltage value of the signal transferred through the wiring Wvd, that is, the voltages of the voltage signals Vdd1 and Vdd2 with the voltage value of the voltage signal Vref to determine whether the voltage values of the voltage signals Vdd1 and Vdd2 are large sufficient to drive the head unit 10. That is, the power supply abnormality determining circuit 110 determines whether the voltage values of the voltage signals Vdd1 and Vdd2 are normal. When the power supply abnormality determining circuit 110 determines that the voltage values of the voltage signals Vdd1 and Vdd2 are normal, the power supply abnormality determining circuit 110 outputs the determination result signal Rs having the voltage value of the signal transferred through the wiring Wvd. When the power supply abnormality determining circuit 110 determines that at least one of the voltage values of the voltage signals Vdd1 and Vdd2 is not normal, the power supply abnormality determining circuit 110 outputs the determination result signal Rs at the ground potential.

In the following description, when the voltage values of the voltage signals Vdd1 and Vdd2 are normal, the power supply abnormality determining circuit 110 may output an H-level determination result signal Rs, and when at least one of the voltage values of the voltage signals Vdd1 and Vdd2 is not normal, the power supply abnormality determining circuit 110 may output an L-level determination result signal Rs.

As the voltage signal Vref input to the comparator 114, a bandgap reference voltage can be used, for example. In this case, the power supply abnormality determining circuit 110 may compare the voltage value of the signal transferred through the wiring Wvd with a voltage signal Vref obtained by boosting the bandgap reference voltage to a predetermined voltage value, and output a determination result signal Rs according to a result of the comparison. In addition, the power supply abnormality determining circuit 110 may compare a voltage value obtained by dividing the voltage value of the signal transferred through the wiring Wvd with the voltage signal Vref and output a determination result signal Rs according to a result of the comparison.

As described above, in the head unit 10 according to the present embodiment, the power supply abnormality determining circuit 110 determines, based on the voltage values of the voltage signals Vdd1 and Vdd2, whether the voltage values of the voltage signals Vdd1 and Vdd2 are normal.

2.4. Functional Configuration of Each Drive Circuit

Figure 7:
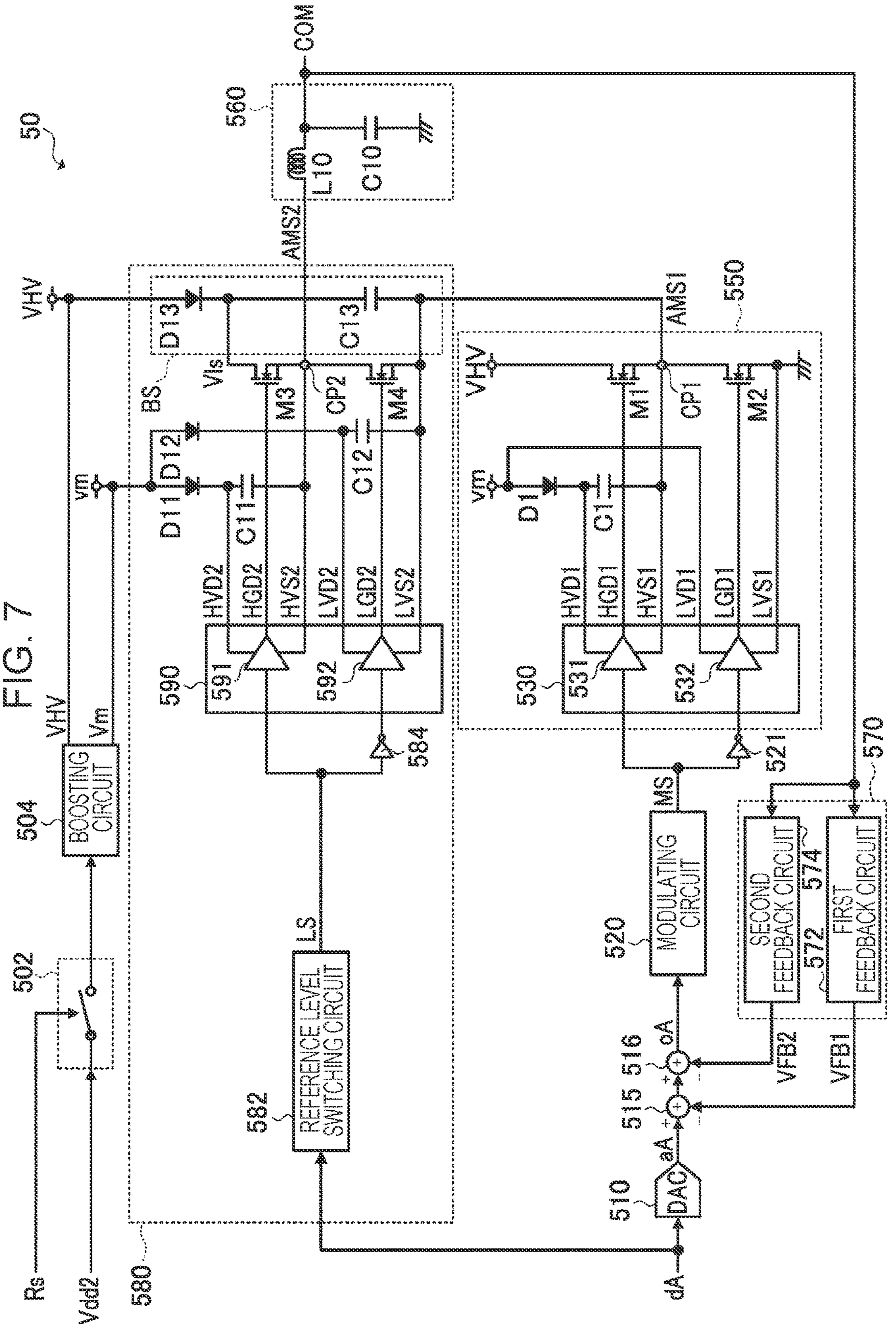
FIG. 7 is a diagram illustrating an example of a functional configuration of a drive circuit.

Next, a configuration and an operation of each of the drive circuits 50 to output a drive signal COM are described. FIG. 7 is a diagram illustrating an example of a functional configuration of the drive circuit 50. As illustrated in FIG. 7, the drive circuit 50 includes a power supply switching circuit 502, a boosting circuit 504, a digital-to-analog converter (DAC) 510, adders 515 and 516, a modulating circuit 520, an amplifying circuit 550, a demodulating circuit 560, a feedback circuit 570, and a level shifting circuit 580.

The voltage signal Vdd2 and the determination result signal Rs are input to the power supply switching circuit 502. The power supply switching circuit 502 switches, based on the logic level of the input determination result signal Rs, whether to supply the voltage signal Vdd2 to the boosting circuit 504. That is, the power supply switching circuit 502 functions as a switching circuit.

Specifically, when the H-level determination result signal Rs indicating that the voltage signal Vdd2 is normal is input to the power supply switching circuit 502, the power supply switching circuit 502 is controlled so as to be conductive from one end of the power supply switching circuit 502 to the other end of the power supply switching circuit 502. As a result, the voltage signal Vdd2 and various signals generated based on the voltage signal Vdd2 are supplied to various configurations included in the drive circuit 50. On the other hand, when the L-level determination result signal Rs indicating that the voltage signal Vdd2 is not normal is input to the power supply switching circuit 502, the power supply switching circuit 502 is controlled so as not to be conductive from the one end of the power supply switching circuit 502 to the other end of the power supply switching circuit 502. As a result, the voltage signal Vdd2 and the various signals generated based on the voltage signal Vdd2 are not supplied to the various configurations included in the drive circuit 50. Therefore, the drive circuit 50 does not generate and output a drive signal COM. That is, when the L-level determination result signal Rs indicating that the voltage signal Vdd2 is not normal is input to the drive circuit 50, the drive circuit 50 stops at least one of the generation and output of the drive signal COM.

When the L-level determination result signal Rs indicating that the voltage signal Vdd2 is not normal is input to the power supply switching circuit 502, the drive circuit 50 may stop at least one of the generation and output of the drive signal COM. Therefore, the drive circuit 50 may have a configuration for controlling operations of the modulating circuit 520, the amplifying circuit 550, the DAC 510, and the like according to the logic level of the determination result signal Rs, instead of or in addition to the power supply switching circuit 502. The modulating circuit 520, the amplifying circuit 550, the DAC 510, and the like are described later.

The voltage signal Vdd2 output by the power supply switching circuit 502 is input to the boosting circuit 504. The boosting circuit 504 boosts the input voltage signal Vdd2 to generate a plurality of signals having voltage values. The plurality of signals include voltage signals VHV and Vm. Thereafter, the boosting circuit 504 outputs the voltage signals VHV and Vm to various configurations included in the drive circuit 50. The voltage VHV generated by the boosting circuit 504 is, for example, a direct-current voltage of 20 V, and the voltage signal Vm generated by the boosting circuit 504 is, for example, a direct-current voltage of 7.5 V.

The base drive signal dA is input to the DAC 510. The DAC 510 converts the input base drive signal dA from digital to analog to obtain an analog base drive signal aA and outputs the analog base drive signal aA.

The base drive signal aA is input to a positive-side input terminal of the adder 515. A feedback signal VFB1 is input to a negative-side input terminal of the adder 515. Thereafter, the adder 515 outputs a signal obtained by subtracting the feedback signal VFB1 from the base drive signal aA. The feedback signal VFB1 input to the adder 515 is the drive signal COM fed back to the adder 515 via the feedback circuit 570. That is, the feedback signal VFB1 input to the adder 515 is obtained by attenuating a voltage value of the drive signal COM by the feedback circuit 570.

The signal output by the adder 515 is input to a positive-side input terminal of the adder 516. A feedback signal VFB2 is input to a negative-side input terminal of the adder 516. Thereafter, the adder 516 outputs, as a corrected base drive signal oA, a signal obtained by subtracting the feedback signal VFB2 from the signal output by the adder 515. The feedback signal VFB2 input to the adder 516 is the drive signal COM fed back to the adder 516 via the feedback circuit 570. That is, the feedback signal VFB2 input to the adder 516 is obtained by extracting a signal of a high-frequency ripple component included in the drive signal COM and attenuating a voltage value of the extracted signal of the ripple component by the feedback circuit 570.

The modulating circuit 520 includes a comparator. The modulating circuit 520 performs pulse modulation so as to modulate the corrected base drive signal oA and to generate a modulated signal MS and outputs the generated modulated signal MS to the amplifying circuit 550. Specifically, the modulating circuit 520 compares a voltage value of the corrected base drive signal oA with a predetermined threshold voltage value. Thereafter, the modulating circuit 520 outputs the modulated signal MS that is at an H level when the voltage value of the corrected base drive signal oA is equal to or larger than the threshold voltage value, and that is at an L level when the voltage value of the corrected base drive signal oA is smaller than the threshold voltage value.

The amplifying circuit 550 includes a gate drive circuit 530, a diode D1, a capacitor C1, and transistors M1 and M2. The amplifying circuit 550 amplifies the modulated signal MS so as to generate an amplified modulated signal AMS1 and outputs the generated amplified modulated signal AMS1 to a midpoint CP1.

The modulated signal MS output by the modulating circuit 520 is input to a gate driver 531 included in the gate drive circuit 530. The gate driver 531 outputs a gate signal HGD1 obtained by level-shifting a voltage value of the input modulated signal MS. In addition, after an inverter 521 inverts the logic level of the modulated signal MS output by the modulating circuit 520, the modulated signal MS with the inverted logic level is input to a gate driver 532 included in the gate drive circuit 530. The gate driver 532 outputs a gate signal LGD1 obtained by level-shifting a voltage value of the signal obtained by inverting the logic level of the input modulated signal MS.

The transistors M1 and M2 are N-channel MOS-FETs. The gate signal HGD1 output by the gate driver 531 is input to the gate terminal of the transistor M1. The voltage signal VHV is input to the drain terminal of the transistor M1. The source terminal of the transistor M1 is electrically coupled to the midpoint CP1. The gate signal LGD1 output by the gate driver 532 is input to the gate terminal of the transistor M2. The drain terminal of the transistor M2 is electrically coupled to the midpoint CP1. The ground potential is supplied to the source terminal of the transistor M2. The transistor M1 operates based on the gate signal HGD1 and the transistor M2 operates based on the gate signal LGD1 such that the amplified modulated signal AMS1 is generated at the midpoint CP1 by amplifying the modulated signal MS with the voltage signal VHV.

An operation of the gate drive circuit 530 to output the gate signal HGD1 and the gate signal LGD1 is described below. The gate drive circuit 530 includes the gate drivers 531 and 532. As described above, the modulated signal MS is input to the gate driver 531. In addition, the signal obtained by inverting the logic level of the modulated signal MS by the inverter 521 is input to the gate driver 532. That is, each of the signal input to the gate driver 531 and the signal input to the gate driver 532 is exclusively at an H level. In this case, when each of the signals is exclusively at the H level, the H-level signals may not be simultaneously input to the gate drivers 531 and 532. That is, when each of the signals is exclusively at the H level, the L-level signals may be simultaneously input to the gate drivers 531 and 532.

A low-potential-side power supply terminal of the gate driver 531 is electrically coupled to the midpoint CP1. Therefore, a voltage signal HVS1 having a voltage value generated at the midpoint CP1 is supplied to the low-potential-side power supply terminal of the gate driver 531. A high-potential-side power supply terminal of the gate driver 531 is electrically coupled to the cathode terminal of the diode D1 and one end of the capacitor C1. The voltage signal Vm is supplied to the anode terminal of the diode D1. The other end of the capacitor C1 is electrically coupled to the midpoint CP1. That is, a voltage output by a bootstrap circuit including the diode D1 and the capacitor C1 is supplied to the high-potential-side power supply terminal of the gate driver 531. Therefore, a voltage signal HVD1 having a voltage value larger by the voltage value of the voltage signal Vm than the voltage value of the voltage signal HVS1 is input to the high-potential-side power supply terminal of the gate driver 531. In this case, the voltage value of the voltage signal HVS1 is the voltage value of the midpoint CP1. Thereafter, when the H-level modulated signal MS is input to the gate driver 531, the gate driver 531 outputs the gate signal HGD1 having the voltage value of the voltage signal HVD1. When the L-level modulated signal MS is input to the gate driver 531, the gate driver 531 outputs the gate signal HGD1 having the voltage value of the voltage signal HVS1.

A voltage signal LVS1 at the ground potential is supplied to a low-potential-side power supply terminal of the gate driver 532. A voltage signal LVD1 having the voltage value of the voltage signal Vm is supplied to a high-potential-side power supply terminal of the gate driver 532. Thereafter, when the H-level signal obtained by inverting the logic level of the L-level modulated signal MS by the inverter 521 is input to the gate driver 532, the gate driver 532 outputs the gate signal LGD1 having the voltage value of the voltage signal LVD1. When the L-level signal obtained by inverting the logic level of the H-level modulated signal MS by the inverter 521 is input to the gate driver 532, the gate driver 532 outputs the gate signal LGD1 having the voltage value of the voltage signal LVS1.

As described above, the amplifying circuit 550 includes the gate drive circuit 530 and the transistors M1 and M2. The gate drive circuit 530 outputs the gate signal HGD1 and the gate signal LGD1 based on the modulated signal MS. The transistor M1 has the drain terminal that serves as one end of the transistor M1 and to which the voltage signal VHV is supplied, the source terminal serving as the other end of the transistor M1 and electrically coupled to the midpoint CP1, and the gate terminal to which the gate signal HGD1 is input. The transistor M1 operates based on the input gate signal HGD1. The transistor M2 has the drain terminal serving as one end of the transistor M2 and electrically coupled to the midpoint CP1, the source terminal that serves as the other end of the transistor M2 and to which the ground potential is supplied, and the gate terminal to which the gate signal LGD1 is input. The transistor M2 operates based on the gate signal LGD1. The amplifying circuit 550 outputs, to the midpoint CP1 coupled to the transistor M1 and the transistor M2, the amplified modulated signal AMS1 obtained by amplifying the modulated signal MS with the voltage value of the voltage signal VHV.

The level shifting circuit 580 includes a reference level switching circuit 582, a gate drive circuit 590, diodes D11 and D12, capacitors C11 and C12, transistors M3 and M4, and a bootstrap circuit BS. The level shifting circuit 580 level-shifts a reference potential of the amplified modulated signal AMS1 to generate a level-shifted amplified modulated signal AMS2 and outputs the generated level-shifted amplified modulated signal AMS2 to a midpoint CP2.

The base drive signal dA is input to the reference level switching circuit 582 included in the level shifting circuit 580. When a voltage value defined by the input base drive signal dA is equal to or larger than a predetermined voltage value, the reference level switching circuit 582 outputs an H-level reference level switching signal LS to the gate drive circuit 590. When the voltage value defined by the input base drive signal dA is smaller than the predetermined voltage value, the reference level switching circuit 582 outputs an L-level reference level switching signal LS to the gate drive circuit 590. The predetermined voltage value is equal to or smaller than the voltage value of the voltage signal VHV supplied to the amplifying circuit 550 and is preferably close to the voltage value of the voltage signal VHV.

The gate drive circuit 590 outputs, based on the logic level of the reference level switching signal LS output by the reference level switching circuit 582, a gate signal HGD2 for driving the transistor M3 and a gate signal LGD2 for driving the transistor M4.

The reference level switching signal LS output by the reference level switching circuit 582 is input to a gate driver 591 included in the gate drive circuit 590. The gate driver 591 outputs the gate signal HGD2 obtained by level-shifting a voltage value of the input reference level switching signal LS. In addition, after an inverter 584 inverts the logic level of the reference level switching signal LS output by the reference level switching circuit 582, the reference level switching signal LS with the inverted logic level is input to a gate driver 592 included in the gate drive circuit 590. The gate driver 592 outputs the gate signal LGD2 obtained by level-shifting a voltage value of the signal obtained by inverting the logic level of the input reference level switching signal LS.

The transistors M3 and M4 are N-channel MOS-FETs. The gate signal HGD2 output by the gate driver 591 is input to the gate terminal of the transistor M3. A level-shifted voltage signal Vls output by the bootstrap circuit BS is input to the drain terminal of the transistor M3. The source terminal of the transistor M3 is electrically coupled to the midpoint CP2. The gate signal LGD2 output by the gate driver 592 is input to the gate terminal of the transistor M4. The drain terminal of the transistor M4 is electrically coupled to the midpoint CP2. The source terminal of the transistor M4 is electrically coupled to the midpoint CP1. The transistor M3 operates based on the gate signal HGD2 and the transistor M4 operates based on the gate signal LGD2 such that the level-shifted amplified modulated signal AMS2 obtained by level-shifting, based on the voltage signal VHV, the reference potential of the amplified modulated signal AMS1 output to the midpoint CP1 is output to the midpoint CP2 electrically coupled to the transistor M3 and the transistor M4.

That is, the level-shifted voltage signal Vls output by the bootstrap circuit BS is supplied to the drain terminal of the transistor M3 included in the level shifting circuit 580. The drain terminal of the transistor M3 serves as one end of the transistor M3. The source terminal of the transistor M3 serves as the other end of the transistor M3 and is electrically coupled to the midpoint CP2. The transistor M3 operates based on the gate signal HGD2 output by the gate driver 591. The drain terminal of the transistor M4 included in the level shifting circuit 580 serves as one end of the transistor M4 and is electrically coupled to the midpoint CP2. The amplified modulated signal AMS1 output by the amplifying circuit 550 is supplied to the source terminal of the transistor M4. The source terminal of the transistor M4 serves as the other end of the transistor M4. The transistor M4 operates based on the gate signal LGD2 output by the gate driver 592. The level shifting circuit 580 outputs, as the level-shifted amplified modulated signal AMS2, a signal generated at the midpoint CP2 electrically coupled to the transistor M3 and the transistor M4.

The bootstrap circuit BS includes a diode D13 and a capacitor C13. The voltage signal VHV is supplied to the anode terminal of the diode D13. The cathode terminal of the diode D13 is electrically coupled to one end of the capacitor C13. The other end of the capacitor C13 is electrically coupled to the midpoint CP1. That is, the voltage signal VHV and the amplified modulated signal AMS1 output to the midpoint CP1 are input to the bootstrap circuit BS. Thereafter, the bootstrap circuit BS generates the level-shifted voltage signal Vls obtained by adding the voltage value of the amplified modulated signal AMS1 to the voltage value of the voltage signal VHV and outputs the level-shifted voltage signal Vls to the drain terminal of the transistor M3. In other words, the bootstrap circuit BS outputs the level-shifted voltage signal Vls obtained by level-shifting the reference potential of the amplified modulated signal AMS1 based on the voltage signal VHV. That is, the level-shifted voltage signal Vls is based on the voltage signal VHV and the amplified modulated signal AMS1.

An operation of the gate drive circuit 590 to output the gate signal HGD2 and the gate signal LGD2 is described below. The gate drive circuit 590 includes the gate drivers 591 and 592. As described above, the reference level switching signal LS is input to the gate driver 591. The signal obtained by inverting the logic level of the reference level switching signal LS by the inverter 584 is input to the gate driver 592. That is, each of the signal input to the gate driver 591 and the signal input to the gate driver 592 is exclusively at an H level.

A low-potential-side power supply terminal of the gate driver 591 is electrically coupled to the midpoint CP2. Therefore, a voltage signal HVS2 having a voltage value generated at the midpoint CP2 is supplied to the low-potential-side power supply terminal of the gate driver 591. A high-potential-side power supply terminal of the gate driver 591 is electrically coupled to the cathode terminal of the diode D11 and one end of the capacitor C11. The voltage signal Vm is supplied to the anode terminal of the diode D11. The other end of the capacitor C11 is electrically coupled to the midpoint CP2. That is, a voltage output by a bootstrap circuit including the diode D11 and the capacitor C11 is supplied to the high-potential-side power supply terminal of the gate driver 591. Therefore, a voltage signal HVD2 having a voltage value larger by the voltage value of the voltage signal Vm than the voltage value of the midpoint CP2, that is, than the voltage value of the voltage signal HVS2 is supplied to the high-potential-side power supply terminal of the gate driver 591. When the H-level reference level switching signal LS is input to the gate driver 591, the gate driver 591 outputs the gate signal HGD2 having the voltage value of the voltage signal HVD2. When the L-level reference level switching signal LS is input to the gate driver 591, the gate driver 591 outputs the gate signal HGD2 having the voltage value of the voltage signal HVS2.

A low-potential-side power supply terminal of the gate driver 592 is electrically coupled to the midpoint CP1. Therefore, the amplified modulated signal AMS1 generated at the midpoint CP1 is supplied as a voltage signal LVS2 to the low-potential-side power supply terminal of the gate driver 592. A high-potential-side power supply terminal of the gate driver 592 is electrically coupled to the cathode terminal of the diode D12 and one end of the capacitor C12. The voltage signal Vm is supplied to the anode terminal of the diode D12. The other end of the capacitor C12 is electrically coupled to the midpoint CP1. That is, a voltage output by a bootstrap circuit including the diode D12 and the capacitor C12 is supplied to the high-potential-side power supply terminal of the gate driver 592. Therefore, a voltage signal LVD2 having a voltage value larger by the voltage value of the voltage signal Vm than a voltage value of the voltage signal LVS2 is supplied to the high-potential-side power supply terminal of the gate driver 592. Thereafter, when the H-level signal obtained by inverting the logic level of the L-level reference level switching signal LS by the inverter 584 is input to the gate driver 592, the gate driver 592 outputs the gate signal LGD2 having the voltage value of the voltage signal LVD2. When the L-level signal obtained by inverting the logic level of the H-level reference level switching signal LS by the inverter 584 is input to the gate driver 592, the gate driver 592 outputs the gate signal HGD2 having the voltage value of the voltage signal LVS2.

In the level shifting circuit 580 configured in the above-described manner, when the transistor M3 is controlled based on the gate signal HGD2 so as not to be conductive from the source terminal of the transistor M3 to the drain terminal of the transistor M3, and the transistor M4 is controlled based on the gate signal LGD2 so as to be conductive from the source terminal of the transistor M4 to the drain terminal of the transistor M4, that is, when the reference level switching circuit 582 outputs the L-level reference level switching signal LS, the midpoint CP1 of the amplifying circuit 550 is electrically coupled to the midpoint CP2 of the level shifting circuit 580 via the transistor M4. Therefore, the level shifting circuit 580 outputs, as the level-shifted amplified modulated signal AMS2, the amplified modulated signal AMS1 supplied to the midpoint CP2 through the transistor M4.

On the other hand, when the transistor M3 is controlled based on the gate signal HGD2 so as to be conductive from the source terminal of the transistor M3 to the drain terminal of the transistor M3, and the transistor M4 is controlled based on the gate signal LGD2 so as not to be conductive from the source terminal of the transistor M4 to the drain terminal of the transistor M4, that is, when the reference level switching circuit 582 outputs the H-level reference level switching signal LS, the midpoint CP1 of the amplifying circuit 550 is electrically coupled to the midpoint CP2 of the level shifting circuit 580 via the bootstrap circuit BS and the transistor M3. Therefore, the level shifting circuit 580 outputs, as the level-shifted amplified modulated signal AMS2, the level-shifted voltage signal Vls obtained by level-shifting the reference potential of the amplified modulated signal AMS1 based on the voltage signal VHV.

The level-shifted amplified modulated signal AMS2 output by the level shifting circuit 580 is input to the demodulating circuit 560. The demodulating circuit 560 smooths the input level-shifted amplified modulated signal AMS2 so as to demodulate the input level-shifted amplified modulated signal AMS2 and generate the drive signal COM. The drive signal COM generated by the demodulating circuit 560 is output from the drive circuit 50. In other words, the demodulating circuit 560 demodulates the level-shifted amplified modulated signal AMS2 so as to obtain the drive signal COM and outputs the drive signal COM.

The demodulating circuit 560 includes an inductor L10 and a capacitor C10. One end of the inductor L10 is electrically coupled to the midpoint CP2. The other end of the inductor L10 is electrically coupled to one end of the capacitor C10. The ground potential is supplied to the other end of the capacitor C10. That is, the inductor L10 and the capacitor C10 constitute a low-pass filter circuit. The level-shifted amplified modulated signal AMS2 output from the level shifting circuit 580 is smoothed by the low-pass filter circuit. The drive circuit 50 outputs the smoothed level-shifted amplified modulated signal AMS2 as the drive signal COM.

The feedback circuit 570 includes a first feedback circuit 572 and a second feedback circuit 574. The drive signal COM output by the demodulating circuit 560 is input to the first feedback circuit 572 and the second feedback circuit 574.

The first feedback circuit 572 attenuates the voltage value of the input drive signal COM. Thereafter, the first feedback circuit 572 feeds back the attenuated signal as the feedback signal VFB1 to the adder 515. The second feedback circuit 574 includes a high-pass filter circuit and a low-pass filter circuit that are not illustrated in FIG. 7. The high-pass filter circuit removes a low-frequency component of the input drive signal COM and extracts a signal of a high-frequency ripple component from the input drive signal COM. The low-pass filter circuit removes a noise component superimposed on the signal of the high-frequency ripple component. The second feedback circuit 574 attenuates a signal obtained by removing the noise component from the signal of the high-frequency ripple component included in the drive signal COM and feeds back the attenuated signal as the feedback signal VFB2 to the adder 516.

As described above, the low-pass filter circuit included in the demodulating circuit 560 smooths the level-shifted amplified modulated signal AMS2 obtained by level-shifting the reference voltage of the amplified modulated signal AMS1 so as to generate the drive signal COM to be output by the drive circuit 50. Since the drive signal COM is attenuated by the first feedback circuit 572 and fed back to the adder 515, the drive circuit 50 self-oscillates at a frequency determined by the delay of the first feedback circuit 572 and a feedback transfer function of the first feedback circuit 572. However, when only a feedback path including the first feedback circuit 572 is present, the amount of delay in the first feedback circuit 572 may be large, and thus the frequency at which the drive circuit 50 self-oscillates may not be increased to the extent that the accuracy of a signal waveform of the drive signal COM can be sufficiently ensured. In the drive circuit 50 according to the present embodiment, the second feedback circuit 574 that feeds back the high-frequency ripple component included in the drive signal COM is provided in addition to the feedback path including the first feedback circuit 572. Therefore, the amount of delay in the entire drive circuit 50 can be small and the frequency of the modulated signal MS can be increased to the extent that the accuracy of the signal waveform of the drive signal COM can be sufficiently ensured. Therefore, the frequency at which the drive circuit 50 self-oscillates can be increased to the extent that the accuracy of the signal waveform of the drive signal COM can be sufficiently ensured. As a result, it is possible to increase the accuracy of the signal waveform of the drive signal COM to be output by the drive circuit 50.

As described above, the drive circuit 50 according to the present embodiment includes the modulating circuit 520, the amplifying circuit 550, the level shifting circuit 580, and the demodulating circuit 560. The modulating circuit 520 outputs the modulated signal MS obtained by modulating the corrected base drive signal oA on which the drive signal COM is based. The amplifying circuit 550 outputs the amplified modulated signal AMS1 obtained by amplifying the modulated signal MS. The level shifting circuit 580 outputs the level-shifted amplified modulated signal AMS2 obtained by level-shifting the reference potential of the amplified modulated signal AMS1. The demodulating circuit 560 demodulates the level-shifted amplified modulated signal AMS2 so as to obtain the drive signal COM and outputs the drive signal COM.

The drive circuit 50 configured in the above-described manner includes a so-called class-D amplifying circuit that amplifies and demodulates the modulated signal MS obtained by modulating the corrected base drive signal oA so as to generate the drive signal COM. Therefore, the drive circuit 50 according to the present embodiment can amplify the signal with higher efficiency and with lower power consumption, as compared with cases where a class-A amplifying circuit, a class-B amplifying circuit, and a class-AB amplifying circuit are used. In addition, the drive circuit 50 according to the present embodiment generates the drive signal COM by causing the level shifting circuit 580 to level-shift the reference potential of the amplified modified signal AMS1 generated by amplifying the modulated signal MS by the amplifying circuit 550. In the drive circuit 50, the voltage value of the voltage signal VHV can be lower than the voltage value of the drive signal COM to be output. Therefore, it is possible to reduce a loss of power in the transistors M1 and M2 included in the amplifying circuit 550. That is, in the drive circuit 50 according to the present embodiment, power consumption is lower as compared with cases where a class-A amplifying circuit, a class-B amplifying circuit, and a class-AB amplifying circuit are used. In addition, in the drive circuit 50 according to the present embodiment, power consumption can be lower as compared with a case where an existing class-D amplifying circuit is used.

2.5. Functional Configuration of Each Drive Signal Selection Control Circuit

Next, a configuration and an operation of each of the drive signal selection control circuits 200 are described. As described above, the drive signal selection control circuit 200 generates drive signals VOUT corresponding to the ejecting units 600 by selecting or unselecting a signal waveform included in the drive signal COM based on the clock signal SCK, the print data signal SI, the latch signal LAT, and the change signal CH, and outputs the drive signals VOUT to the corresponding ejecting units 600. Before the operation and operation of the drive signal selection control circuit 200 are described, an example of the signal waveform of the drive signal COM input to the drive signal selection control circuit 200 is described below.

Figure 8:
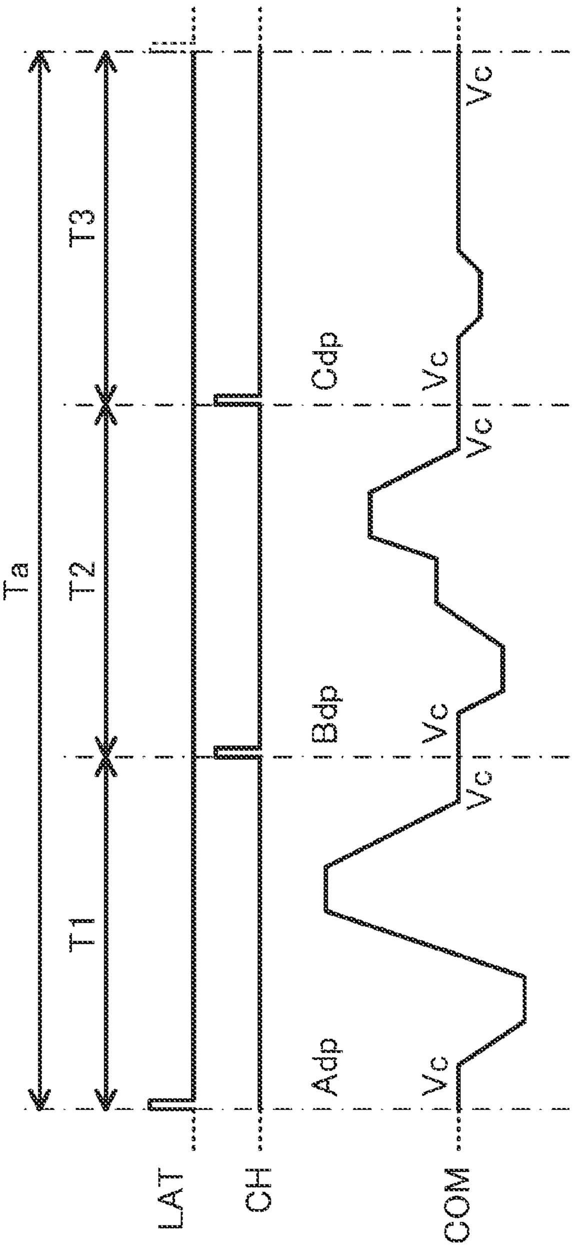
FIG. 8 is a diagram illustrating an example of a signal waveform of a drive signal.

FIG. 8 is a diagram illustrating an example of the signal waveform of the drive signal COM. As illustrated in FIG. 8, the drive signal COM includes a trapezoidal waveform Adp in a time period T1 from a rising edge of the latch signal LAT to a rising edge of the change signal CH, a trapezoidal waveform Bdp in a time period T2 from the rising edge of the change signal CH to the next rising edge of the change signal CH, and a trapezoidal waveform Cdp in a time period T3 from the rising edge of the change signal CH that is the end of the time period T2 to the next rising edge of the latch signal LAT. The trapezoidal waveform Adp is a signal waveform for driving a piezoelectric element 60 to eject ink in a predetermined amount from an ejecting unit 600 corresponding to the piezoelectric element 60 when the trapezoidal waveform Adp is supplied to the piezoelectric element 60. The trapezoidal waveform Bdp is a signal waveform for driving a piezoelectric element 60 to eject ink in an amount smaller than the predetermined amount from an ejecting unit 600 corresponding to the piezoelectric element 60 when the trapezoidal waveform Bdp is supplied to the piezoelectric element 60. The trapezoidal waveform Cdp is a signal waveform for driving a piezoelectric element 60 to the extent that ink is not ejected from an ejecting unit 600 corresponding to the piezoelectric element 60 when the trapezoidal waveform Cdp is supplied to the piezoelectric element 60. When the trapezoidal waveform Cdp is supplied to the piezoelectric element 60, the piezoelectric element 60 vibrates ink in the vicinity of the opening of the nozzle of the ejecting unit 600 corresponding to the piezoelectric element

60. Therefore, the vibration reduces the possibility that the viscosity of the ink in the vicinity of the opening of the nozzle may increase.

A voltage at the start timing of each of the trapezoidal waveforms Adp, Bdp, and Cdp and a voltage at the end timing of each of the trapezoidal waveforms Adp, Bdp, and Cdp are a common voltage Vc. That is, each of the trapezoidal waveforms Adp, Bdp, and Cdp is a signal waveform that starts at the voltage Vc and ends at the voltage Vc.

In the following description, the predetermined amount of ink ejected from an ejecting unit 600 corresponding to a piezoelectric element 60 when the trapezoidal waveform Adp is supplied to the piezoelectric element 60 may be referred to as a medium amount. In addition, the amount of ink ejected from an ejecting unit 600 corresponding to a piezoelectric element 60 when the trapezoidal waveform Bdp is supplied to the piezoelectric element 60 is smaller than the predetermined amount and may be referred to as a small amount. In addition, an operation of vibrating ink in the vicinity of an opening of a nozzle of an ejecting unit 600 corresponding to a piezoelectric element 60 so as to prevent an increase in the viscosity of the ink when the trapezoidal waveform Cdp is supplied to the piezoelectric element 60 may be referred to as slight vibration. The signal waveform of the drive signal COM illustrated in FIG. 8 is an example and is not limited thereto. The signal waveform of the drive signal COM may include a combination of signal waveforms with various shapes according to properties of the ink to be ejected, the material of the medium on which the ink lands, and the like.

The drive signal selection control circuit 200 according to the present embodiment controls the amount of ink to be ejected from each of the ejecting units 600 by selecting or unselecting each of the trapezoidal waveforms Adp, Bdp, and Cdp in a period Ta including the time periods T1, T2, and T3. That is, a size of a dot to be formed on the medium in each period Ta is controlled. The period Ta including the time periods T1, T2, and T3 may be referred to as a dot formation period in which a dot of a predetermined size is formed on the medium.

Figure 9:
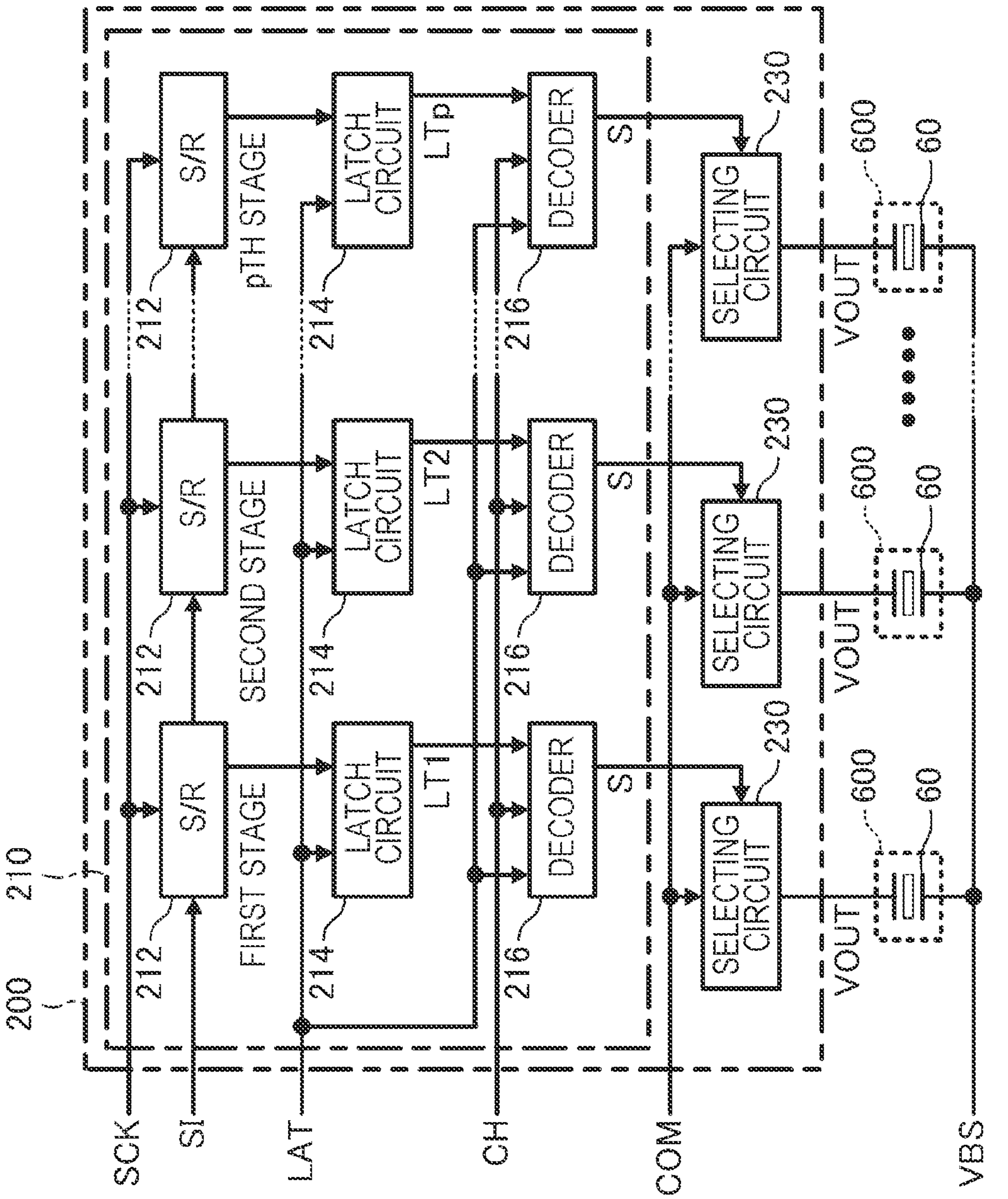
FIG. 9 is a diagram illustrating an example of a configuration of a drive signal selection control circuit.

Next, a configuration and an operation of the drive signal selection control circuit 200 to generate a drive signal VOUT by selecting or unselecting a signal waveform included in the drive signal COM are described. FIG. 9 is a diagram illustrating the configuration of the drive signal selection control circuit 200. As illustrated in FIG. 9, the drive signal selection control circuit 200 includes a selection control circuit 210 and a plurality of selecting circuits 230.

The clock signal SCK, the print data signal SI, the latch signal LAT, and the change signal CH are input to the selection control circuit 210. In the selection control circuit 210, a set of a shift register (S/R) 212, a latch circuit 214, and a decoder 216 is disposed corresponding to each of the ejecting units 600. That is, when the ejecting head 20 includes a number p of ejecting units 600, the drive signal selection control circuit 200 includes a number p of shift registers 212, a number p of latch circuits 214, and a number p of decoders 216.

The print data signal SI is synchronized with the clock signal SCK and input to the selection control circuit 210. The print data signal SI serially includes 2-bit print data [SIH, SIL] for selecting any of a "large dot LD", a "medium dot MD", a "small dot SD", and "non-recording ND" for each of the number p of ejecting units 600. That is, the print data signal SI is a serial signal of at least 2p bits. The print data [SIH, SIL] included in the print data signal SI is held in the number p of shift registers 212 corresponding to the number p of ejecting units 600.

Specifically, the number p of shift registers 212 corresponding to the ejecting units 600 are coupled to each other in cascade, and the print data signal SI serially input is sequentially transferred to the shift registers 212 in subsequent stages in accordance with the clock signal SCK. When the print data [SIH, SIL] is held in the corresponding shift registers 212, the clock signal SCK is stopped. In other words, by stopping the supply of the clock signal SCK, the print data [SIH, SIL] included in the print data signal SI is held in the corresponding shift registers 212. FIG. 9 illustrates the first stage, the second stage, . . . , and the pth stage from the side from which the print data signal SI is input in order to distinguish the number p of shift registers 212.

Figures 10, 11:
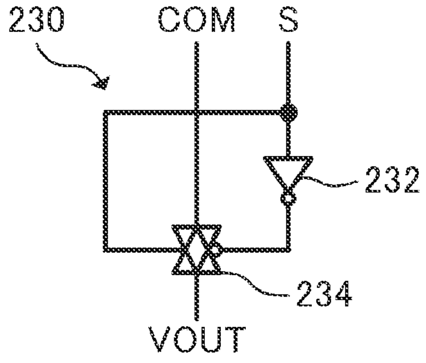
FIG. 10 is a diagram illustrating an example of details decoded by a decoder.
FIG. 11 is a diagram illustrating a configuration of a selecting circuit corresponding to a single ejecting unit.

Each of the number p of the latch circuits 214 collectively latches the print data [SIH, SIL] held in the corresponding shift register 212 at a rising edge of the latch signal LAT. Thereafter, the print data [SIH, SIL] latched by each of the latch circuits 214 is input to the corresponding decoder 216. FIG. 10 is a diagram illustrating an example of details decoded by the decoder 216. The decoder 216 outputs a selection signal S of a logic level defined by the input print data [SIH, SIL] in each of the time periods T1, T2, and T3. For example, when print data [SIH, SIL]=[1, 0] is input to the decoder 216, the decoder 216 outputs a selection signal S of logic levels H, L, and L in the time periods T1, T2, and T3.

Selection signals S output by the decoders 216 are input to the selecting circuits 230. The selecting circuits 230 are provided corresponding to the number p of ejecting units 600. That is, the drive signal selection control circuit 200 includes the same number p of selecting circuits 230 as the number of ejecting units 600 included in the ejecting head 20. FIG. 11 is a diagram illustrating a configuration of a selecting circuit 230 corresponding to a single ejecting unit 600. As illustrated in FIG. 11, the selecting circuit 230 includes an inverter 232 and a transfer gate 234. The inverter 232 is a NOT circuit.

The selection signal S is input to a positive control terminal of the transfer gate 234. In FIG. 11, the positive control terminal of the transfer gate 234 is not marked with a circle. After the logic level of the selection signal S is inverted by the inverter 232, the selection signal S with the inverted logic level is also input to a negative control terminal of the transfer gate 234. In FIG. 11, the negative control terminal of the transfer gate 234 is marked with a circle. The drive signal COM is supplied to an input terminal of the transfer gate 234. When the H-level selection signal S is input to the transfer gate 234, the transfer gate 234 becomes conductive from the input terminal of the transfer gate 234 to an output terminal of the transfer gate 234. When the L-level selection signal S is input to the transfer gate 234, the transfer gate 234 becomes non-conductive from the input terminal of the transfer gate 234 to the output terminal of the transfer gate 234. That is, when the logic level of the selection signal S input to the transfer gate 234 is an H level, the transfer gate 234 outputs a signal waveform included in the drive signal COM from the output terminal. When the logic level of the selection signal S input to the transfer gate 234 is an L level, the transfer gate 234 does not output a signal waveform included in the drive signal COM from the output terminal.

Thereafter, the drive signal selection control circuit 200 outputs, as a drive signal VOUT, the signal output to the output terminal of the transfer gate 234 included in the selecting circuit 230.

Figure 12:
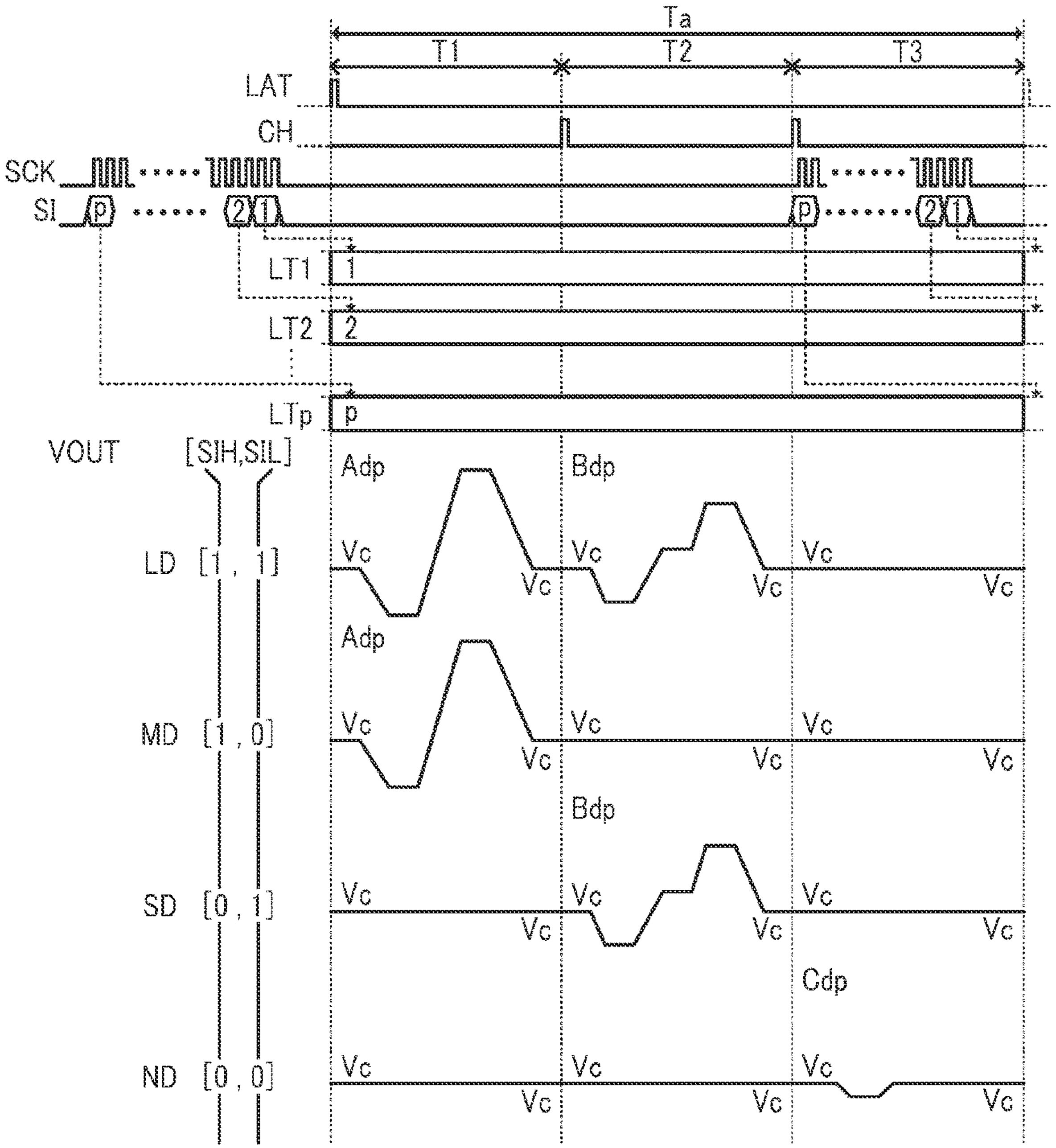
FIG. 12 is a diagram for explaining an operation of the drive signal selection control circuit.

An operation of the drive signal selection control circuit 200 is described below with reference to FIG. 12. FIG. 12 is a diagram for explaining the operation of the drive signal selection control circuit 200. The print data signal SI is input to the selection control circuit 210 as a serial signal synchronized with the clock signal SCK. The print data signal SI is synchronized with the clock signal SCK and is sequentially transferred to the number p of shift registers 212 corresponding to the number p of ejecting units 600. Thereafter, when the input of the clock signal SCK is stopped, the print data [SIH, SIL] corresponding to the number p of ejecting units 600 is held in the shift registers 212.

Thereafter, when the latch signal LAT rises, each of the latch circuits 214 collectively latches the print data [SIH, SIL] held in each of the shift registers 212. LT1, LT2, . . . , and LTp illustrated in FIG. 12 indicate the print data [SIH, SIL] latched by the latch circuits 214 corresponding to the shift registers 212 in the first stage, the second stage, . . . , and the pth stage, respectively.

Each of the decoders 216 outputs a logic level of a selection signal S based on the details illustrated in FIG. 10 according to a dot size defined by the latched print data [SIH, SIL] in each of the time periods T1, T2, and T3. Thereafter, each of the selecting circuits 230 generates a drive signal VOUT by selecting or unselecting each of the signal waveforms included in the drive signal COM according to the logic levels of the selection signal S output by each of the decoders 216.

Specifically, when print data [SIH, SIL]=[1, 1] is input to a decoder 216, the decoder 216 sets logic levels of a selection signal S to H, H, and L levels in the time periods T1, T2, and T3. Therefore, the selecting circuit 230 corresponding to the decoder 216 selects the trapezoidal waveform Adp in the time period T1, selects the trapezoidal waveform Bdp in the time period T2, and does not select the trapezoidal waveform Cdp in the time period T3. As a result, the drive signal selection control circuit 200 outputs a drive signal VOUT corresponding to the "large dot LD".

When the drive signal VOUT corresponding to the "large dot LD" is supplied to the piezoelectric element 60 included in the ejecting unit 600 corresponding to the selecting circuit 230, the ejecting unit 600 ejects ink in the medium amount in the time period T1, ejects ink in the small amount in the time period T2, and does not eject ink in the time period T3. Thereafter, the ink in the medium amount ejected from the ejecting unit 600 and the ink in the small amount ejected from the ejecting unit 600 land and are combined on the medium, and as a result, the "large dot LD" is formed on the medium.

In addition, when print data [SIH, SIL]=[1, 0] is input to a decoder 216, the decoder 216 sets logic levels of a selection signal S to H, L, and L levels in the time periods T1, T2, and T3. Therefore, the selecting circuit 230 corresponding to the decoder 216 selects the trapezoidal waveform Adp in the time period T1, does not select the trapezoidal waveform Bdp in the time period T2, and does not select the trapezoidal waveform Cdp in the time period T3. As a result, the drive signal selection control circuit 200 outputs a drive signal VOUT corresponding to the "medium dot MD".

When the drive signal VOUT corresponding to the "medium dot MD" is supplied to the piezoelectric element 60 included in the ejecting unit 600 corresponding to the selecting circuit 230, the ejecting unit 600 ejects ink in the medium amount in the time period T1, does not eject ink in the time period T2, and does not eject ink in the time period T3. Thereafter, the ink in the medium amount ejected from the ejecting unit 600 lands on the medium, and as a result, the "medium dot MD" is formed on the medium.

In addition, when print data [SIH, SIL]=[0, 1] is input to a decoder 216, the decoder 216 sets logic levels of a selection signal S to L, H, and L levels in the time period T1, T2, and T3. Therefore, the selecting circuit 230 corresponding to the decoder 216 does not select the trapezoidal waveform Adp in the time period T1, selects the trapezoidal waveform Bdp in the time period T2, and does not select the trapezoidal waveform Cdp in the time period T3. As a result, the drive signal selection control circuit 200 outputs a drive signal VOUT corresponding to the "small dot SD".

When the drive signal VOUT corresponding to the "small dot SD" is supplied to the piezoelectric element 60 included in the ejecting unit 600 corresponding to the selecting circuit 230, the ejecting unit 600 does not eject ink in the time period T1, ejects ink in the small amount in the time period T2, and does not eject ink in the time period T3. Thereafter, the ink in the small amount ejected from the ejecting unit 600 lands on the medium, and as a result, the "small dot SD" is formed on the medium.

In addition, when print data [SIH, SIL]=[0, 0] is input to a decoder 216, the decoder 216 sets logical levels of a selection signal S to L, L, and H levels in the time periods T1, T2, and T3. Therefore, the selecting circuit 230 corresponding to the decoder 216 does not select the trapezoidal waveform Adp in the time period T1, does not select the trapezoidal waveform Bdp in the time period T2, and selects the trapezoidal waveform Cdp in the time period T3. As a result, the drive signal selection control circuit 200 outputs a drive signal VOUT corresponding to the "non-recording ND".

When the drive signal VOUT corresponding to the "non-recording ND" is supplied to the piezoelectric element 60 included in the ejecting unit 600 corresponding to the selecting circuit 230, the ejecting unit 600 does not eject ink in the time period T1, does not eject ink in the time period T2, and does not eject ink in the time period T3. Therefore, ink is not ejected from the ejecting unit 600, and a dot is not formed on the medium according to the "non-recording ND".

In this case, the corresponding selecting circuit 230 outputs the drive signal VOUT including the trapezoidal waveform Cdp. Therefore, the slight vibration is performed on the corresponding ejecting unit 600. As a result, the slight vibration reduces the possibility that the viscosity of ink in the vicinity of the opening of the nozzle of the corresponding ejecting unit 600 may increase.

3. Operation of Detecting Abnormality in Power Supply Voltage in Liquid Ejection System As described above, each of the head units 10 according to the present embodiment includes the connector CN1 that is compliant with the USB standard and to which the voltage signal Vdd is input, the connector CN2 that is compliant with the USB standard and from which the voltage signal Vdd is output, the power supply abnormality determining circuit 110 that determines whether voltage signals Vdd1 and Vdd2 are normal, the drive circuit 50 that outputs a drive signal COM based on the voltage signal Vdd2, the ejecting head 20 that ejects ink when the drive signal COM is supplied to the ejecting head 20, and the casing 12 housing the connectors CN1 and CN2, the power supply abnormality determining circuit 110, the drive circuit 50, and the ejecting head 20 in a state in which at least a portion of the connector CN1 and at least a portion of the connector CN2 are exposed from the casing 12. The liquid ejection system 1 includes the number n of head units 10 described above, specifically, the head units 10-1 to **10-*n* that are the number n of head units 10** and eject ink onto the medium.

In the liquid ejection system 1, the head units 10-1 to **10-*n* are coupled to each other in series via the cables 5-1 to 5**-(*n*−1). Therefore, the image data and the voltage signal Vdd supplied to the liquid ejection system 1 through the cable CB are supplied to the head units 10-1 to **10-*n*. Thereafter, each of the head units 10-1 to 10-*n* is driven by the input voltage signal Vdd and ejects ink in an amount corresponding to the input image data onto the medium at a timing according to the input image data. Therefore, the liquid ejection system 1** forms an image according to the image data on the medium.

In the liquid ejection system 1, the head units 10-1 to **10-*n* are electrically coupled to each other via the cables 3-1 to 3**-(*n*−1). In the liquid ejection system 1, abnormality information indicating an abnormality that occurred in any of the head units 10-1 to **10-*n* is transferred to the head units 10-1 to 10-*n* through the cables 3-1 to 3**-(*n*−1) such that the head units 10-1 to **10-*n* share the abnormality information, and the head units 10-1 to 10-*n*** perform processing according to the abnormality information.

An example of an operation according to the abnormality information in the liquid ejection system 1 is described below. In the following description, when the configurations included in the head units 10-1 to **10-*n* are distinguished and described, "-1" to "-n" are added to the ends of the reference signs of the configurations of the above-described head units 10 to describe the configurations. For example, in the following description, the USB interface circuit 100 included in the head unit 10-*j* (j is any of integers 1 to n) may be referred to as a USB interface circuit 100-*j*, the power supply abnormality determining circuit 110 included in the head unit 10-*j* may be referred to as a power supply abnormality determining circuit 110-*j*, the drive circuit 50 included in the head unit 10-*j* may be referred to as a drive circuit 50-*j*, the ejecting head 20 included in the head unit 10-*j* may be referred to as an ejecting head 20-*j*, a voltage signal Vdd1 output by the USB interface circuit 100-*j* may be referred to as a voltage signal Vdd1**-*j*, a voltage signal Vdd2 output by the power supply abnormality determining circuit **110-*j* may be referred to as a voltage signal Vdd2**-*j*, a determination result signal Rs output by the power supply abnormality determining circuit **110-*j* may be referred to as a determination result signal Rs-j, and a drive signal COM output by the drive circuit 50-*j*** may be referred to as a drive signal COM-j.

Figure 13:
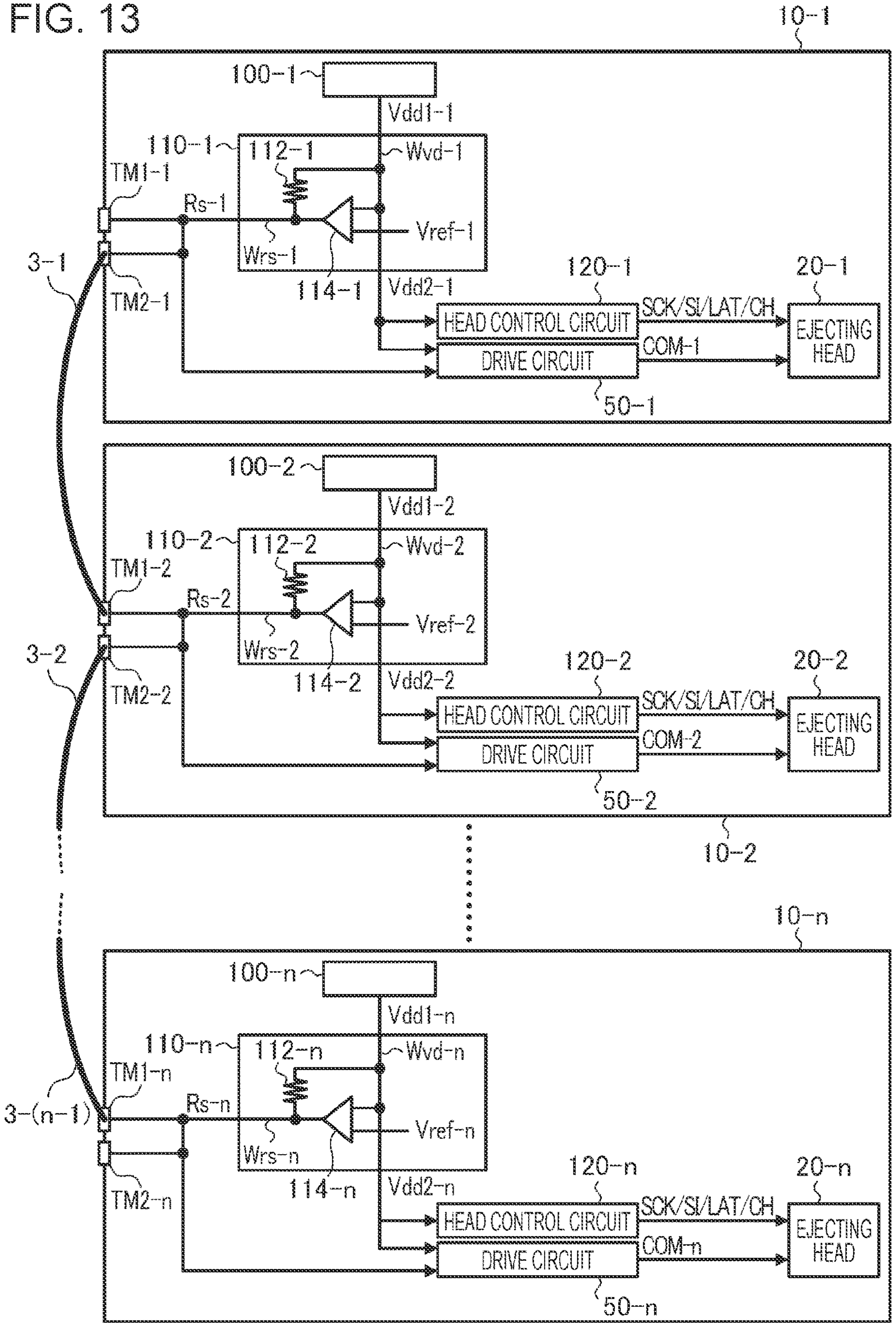
FIG. 13 is a diagram for explaining sharing of abnormality information by head units in the liquid ejection system.

FIG. 13 is a diagram for explaining the sharing of the abnormality information by the head units 10 in the liquid ejection system 1. As illustrated in FIG. 13, the one end of the cable 3-1 is electrically coupled to the terminal TM2-1, and the other end of the cable 3-1 is electrically coupled to the terminal TM1-2. That is, the head unit 10-1 is electrically coupled to the head unit 10-2 via the terminal TM2-1 and the terminal TM1-2. In addition, as described above, the terminal TM2-1 is electrically coupled to the wiring Wrs-1 included in the power supply abnormality determining circuit 110-1, and the terminal TM1-2 is electrically coupled to the wiring Wrs-2 included in the power supply abnormality determining circuit 110-2.

As described above, when a voltage value of a signal transferred through the wiring Wvd-v1, that is, each of voltage values of voltage signals Vdd1-1 and Vdd2-1 serving as a drive voltage of the head unit 10-1 is equal to or larger than a voltage value of a voltage signal Vref-1, the power supply abnormality determining circuit 110-1 sets the impedance of the output terminal of the comparator 114-1 to the high impedance. When the voltage value of the signal transferred through the wiring Wvd-v1, that is, at least one of the voltage values of the voltage signals Vdd1-1 and Vdd2-1 serving as the drive voltage of the head unit 10-1 is smaller than the voltage value of the voltage signal Vref-1, the power supply abnormality determining circuit 110-1 sets the output terminal of the comparator 114-1 to the ground potential. Similarly, when a voltage value of a signal transferred through the wiring Wvd-v2, that is, each of voltage values of voltage signals Vdd1-2 and Vdd2-2 serving as a drive voltage of the head unit 10-2 is equal to or larger than a voltage value of a voltage signal Vref-2, the power supply abnormality determining circuit 110-2 sets the impedance of the output terminal of the comparator 114-2 to the high impedance. When the voltage value of the signal transferred through the wiring Wvd-v2, that is, at least one of the voltage values of the voltage signals Vdd1-2 and Vdd2-2 serving as the drive voltage of the head unit 10-2 is smaller than the voltage value of the voltage signal Vref-2, the power supply abnormality determining circuit 110-2 sets the output terminal of the comparator 114-2 to the ground potential.

Therefore, when at least one of the voltage values of the voltage signals Vdd1-1 and Vdd2-1 is smaller than the voltage value of the voltage signal Vref-1, or when at least one of the voltage values of the voltage signals Vdd1-2 and Vdd2-2 is smaller than the voltage value of the voltage signal Vref-2, a determination result signal Rs-1 to be transferred through the wiring Wrs-1 and a determination result signal Rs-2 to be transferred through the wiring Wrs-2 are set to the ground potential. In other words, the wiring Wrs-1 through which the determination result signal Rs-1 is transferred in the head unit 10-1 and the wiring Wrs-2 through which the determination result signal Rs-2 is transferred in the head unit 10-2 are coupled to each other via the cable 3-1 in a wired-OR connection.

Therefore, when at least one of the voltage values of the voltage signals Vdd1-1 and Vdd2-1 is smaller than the voltage value of the voltage signal Vref-1, or when at least one of the voltage values of the voltage signals Vdd1-2 and Vdd2-2 is smaller than the voltage value of the voltage signal Vref-2, the power supply abnormality determining circuit 110-1 outputs the L-level determination result signal Rs-1 to the drive circuit 50-1, and the power supply abnormality determining circuit 110-2 outputs the L-level determination result signal Rs-2 to the drive circuit 50-2. As a result, the drive circuit 50-1 stops outputting the drive signal COM-1 and the drive circuit 50-2 stops outputting the drive signal COM-2. Therefore, the ejecting head 20-1 and the ejecting head 20-2 stop ejecting ink.

That is, in the liquid ejection system 1 according to the present embodiment, when the power supply abnormality determining circuit 110-1 included in the head unit 10-1 determines that at least one of the voltage signals Vdd1-1 and Vdd2-1 is not normal, or when the power supply abnormality determining circuit 110-2 included in the head unit 10-2 determines that at least one of the voltage signals Vdd1-2 and Vdd2-2 is not normal, the ejecting head 20-1 and the ejecting head 20-2 stop ejecting ink.

Similarly, one end of the cable **3-*j* is electrically coupled to the terminal TM2**-*j*, and the other end of the cable **3-*j* is electrically coupled to the terminal TM1**-(*j*+1). That is, the head unit **10-*j* is electrically coupled to the head unit 10**-(*j*+1) via the terminal TM2-*j* and the terminal TM1-(*j*+1). In this case, the terminal TM2-*j* is electrically coupled to the wiring Wrs-j included in the power supply abnormality determining circuit **110-*j*, and the terminal TM1**-(*j*+1) is electrically coupled to the wiring Wrs-(j+1) included in the power supply abnormality determining circuit 110-(*j*+1). Therefore, the wiring Wrs-j through which the determination result signal Rs-j is transferred in the head unit 10-*j* and the wiring Wrs-(j+1) through which the determination result signal Rs-(j+1) is transferred in the head unit 10-(*j*+1) are coupled to each other via the cable 3-*j* in a wired-OR connection.

Therefore, when at least one of the voltage values of the voltage signals Vdd1-*j* and Vdd2-*j* is smaller than the voltage value of the voltage signal Vref-j, or when at least one of the voltage values of the voltage signals Vdd1-(*j*+1) and Vdd2-(*j*+1) is smaller than the voltage value of the voltage signal Vref-(j+1), the power supply abnormality determining circuit 110-*j* outputs the L-level determination result signal Rs-j to the drive circuit 50-*j*, and the power supply abnormality determining circuit 110-(*j*+1) outputs the L-level determination result signal Rs-(j+1) to the drive circuit 50-(*j*+1). As a result, the drive circuit 50-*j* stops outputting the drive signal COM-j and the drive circuit 50-*j* stops outputting the drive signal COM-(j+1). Therefore, the head unit 20-*j* and the head unit 20-(*j*+1) stop outputting ink.

That is, in the liquid ejection system 1 according to the present embodiment, when the power supply abnormality determining circuit 110-*j* included in the head unit 10-*j* determines that at least one of the voltage signals Vdd1-*j* and Vdd2-*j* is not normal, or when the power supply abnormality determining circuit 110-(*j*+1) included in the head unit 10-(*j*+1) determines that at least one of the voltage signals Vdd1-(*j*+1) and Vdd2-(*j*+1) is not normal, the ejecting head 20-*j* and the ejecting head 20-(*j*+1) stop ejecting ink.

In addition, as illustrated in FIG. 13, all of the head units 10-1 to 10-*n* included in the liquid ejection system 1 according to the present embodiment are electrically coupled to each other via the cables 3-1 to 3(*n*−1). Specifically, one ends of the cables 3-1 to 3-(*n*−1) are electrically coupled to the terminals TM2-1 to TM2-(*n*−1), respectively, and the other ends of the cables 3-1 to 3-(*n*−1) are electrically coupled to the terminals TM1-2 to TM1-*n*, respectively. That is, the head units 10-1 to 10-*n* are electrically coupled to each other via the terminals TM2-1 to TM2-(*n*−1) and the terminals TM1-2 to TM1-*n*.

That is, the wirings Wrs-1 to Wrs-n through which the determination result signals Rs-1 to Rs-n are transferred in the head units 10-1 to 10-*n* are coupled to each other via the cables 3-1 to 3-(*n*−1) in wired-OR connections. Therefore, when the power supply abnormality determining circuits 110-1 to 110-*n* determine that any of the voltage signals Vdd1-1 to Vdd-n and Vdd2-1 to Vdd2-*n* is not normal, the power supply abnormality determining circuits 110-1 to 110-*n* generate L-level determination result signals Rs-1 to Rs-n, respectively, and output the L-level determination result signals Rs-1 to Rs-n to the drive circuits 50-1 to 50-*n*, respectively. As a result, all of the ejecting heads 20-1 to 20-*n* included in the head units 10-1 to 10-*n* stop ejecting ink.

In other words, when any of the power supply abnormality determining circuits 110-1 to 110-*n* included in the head units 10-1 to 10-*n* determines that the supplied drive voltage is not normal, all of the ejecting heads 20-1 to 20-*n* included in the head units 10-1 to 10-*n* stop ejecting ink.

The head unit 10-1 is an example of a first head unit. The head unit 10-2 is an example of a second head unit. The connector CN1-1 included in the head unit 10-1 is an example of a first USB connector. The connector CN2-1 is an example of a second USB connector. The terminal TM2-1 is an example of a first terminal. The wiring Wrs-1 through which the determination result signal Rs-1 is transferred is an example of a first wiring. The power supply abnormality determining circuit 110-1 is an example of a first determining circuit. The drive circuit 50-1 is an example of a first drive circuit. The ejecting head 20-1 is an example of a first ejecting head. The casing 12-1 housing the connectors CN1-1 and CN2-1, the power supply abnormality determining circuit 110-1, the drive circuit 50-1, and the ejecting head 20-1 is an example of a first casing. The connector CN1-2 included in the head unit 10-2 is an example of a third USB connector. The terminal TM1-2 is an example of a second terminal. The wiring Wrs-2 through which the determination result signal Rs-2 is transferred is an example of a second wiring. The power supply abnormality determining circuit 110-2 is an example of a second determining circuit. The drive circuit 50-2 is an example of a second drive circuit. The ejecting head 20-2 is an example of a second ejecting head. The casing 12-2 housing the connector CN1-2, the power supply abnormality determining circuit 110-2, the drive circuit 50-2, and the ejecting head 20-2 is an example of a second casing.

The voltage signal Vdd input from the host computer to the connector CN1-1 of the head unit 10-1, and the voltage signals Vdd1-1 and Vdd2-1 for driving the head unit 10-1 are examples of a first power supply voltage. The voltage signal Vdd that is based on the voltage signal Vdd, which is an example of the first power supply voltage and is input to the connector CN1-1 of the head unit 10-1, and that is output from the connector CN2-1 of the head unit 10-1 and input to the connector CN1-2 of the head unit 10-2, and the voltage signals Vdd1-2 and Vdd2-2 for driving the head unit 10-2 are examples of a second power supply voltage. The determination result signal Rs-1 is an example of a first determination result signal. The determination result signal Rs-2 is an example of a second determination result signal. The drive signal COM-1 is an example of a first drive signal. The drive signal COM-2 is an example of a second drive signal.

4. Operational Effects

The liquid ejection system 1 configured in the above-described manner includes the plurality of head units 10 including the head units 10-1 and 10-2. The head unit 10-1 includes the power supply abnormality determining circuit 110-1 that determines whether the voltage signals Vdd1-1 and Vdd2-1 according to the voltage signal Vdd supplied from the connector CN1-1 are normal, the drive circuit 50-1 that outputs the drive signal COM-1 based on the voltage signal Vdd2-1, and the ejecting head 20-1 that ejects ink when the drive signal COM-1 is supplied to the ejecting head 20-1. The head unit 10-2 includes the power supply abnormality determining circuit 110-2 that determines whether the voltage signals Vdd1-2 and Vdd2-2 according to the voltage signal Vdd supplied from the connector CN1-2 are normal, the drive circuit 50-2 that outputs the drive signal COM-2 based on the voltage signal Vdd2-2, and the ejecting head 20-2 that ejects ink when the drive signal COM-2 is supplied to the ejecting head 20-2. In the liquid ejection system 1, when the power supply abnormality determining circuit 110-1 determines that at least one of the voltage signals Vdd1-1 and Vdd2-1 is not normal, or when the power supply abnormality determining circuit 110-2 determines that at least one of the voltage signals Vdd1-2 and Vdd2-2 is not normal, the ejecting head 20-1 and the ejecting head 20-2 stop ejecting the ink.

Therefore, even when the amount of power supplied to any of the head units 10-1 and 10-2 is unstable due to instability in the amount of power supplied to the liquid ejection system 1, it is possible to reduce the possibility that ink may be unexpectedly ejected from the ejecting heads 20-1 and 20-2, and as a result, it is possible to reduce the possibility that the quality of an image formed on the medium may decrease, and it is possible to reduce the possibility that a loss of the medium due to a decrease in the quality of an image may occur and to reduce the possibility that a loss of ink due to unexpected ejection of the ink may occur. That is, in the liquid ejection system 1 according to the present embodiment, even when the liquid ejection system 1 includes the plurality of head units 10, it is possible to reduce the possibility that the quality of an image formed on the medium may decrease due to instability in the amount of power supplied to the liquid ejection system 1, and it is possible to reduce the possibility that a loss of the medium due to a decrease in the quality of an image may occur and to reduce the possibility that a loss of ink due to unexpected ejection of the ink from the ejecting heads 20 may occur. Therefore, it is possible to provide the liquid ejection system 1 that reduces the possibility that the quality of an image formed on the medium may decrease, and that reduces an environmental load.

In addition, in the liquid ejection system 1 according to the present embodiment, each of the drive circuits 50-1 to 50-*n* included in the head units 10-1 to 10-*n* includes the modulating circuit 520 that outputs a modulated signal MS obtained by modulating a corrected base drive signal oA on which a drive signal COM is based, the amplifying circuit 550 that outputs an amplified modulated signal AMS1 obtained by amplifying the modulated signal MS, the level shifting circuit 580 that outputs a level-shifted amplified modulated signal AMS2 obtained by level-shifting a reference potential of the amplified modulated signal AMS1, and the demodulating circuit 560 that demodulates the level-shifted amplified modulated signal AMS2 so as to obtain the drive signal COM and outputs the drive signal COM. Therefore, power consumption of each of the drive circuits 50-1 to 50-*n* decreases. As a result, the possibility that the amount of power supplied to the liquid ejection system 1 may become unstable is reduced. Even when the liquid ejection system 1 includes the plurality of head units 10, it is possible to improve the stability of the operation of the liquid ejection system 1.

In addition, in the liquid ejection system 1 according to the present embodiment, in the head units 10-1 to 10-*n*, the wirings Wrs-1 to Wrs-n through which the determination result signals Rs-1 to Rs-n output by the power supply abnormality determining circuits 110-1 to 110-*n* are transferred in the head units 10-1 to 10-*n* are coupled to each other in the wired-OR connections. Therefore, when an abnormality in the drive voltage occurs in any of the head units 10-1 to 10-*n*, the head units 10-1 to 10-*n* can share information indicating the abnormality without a processing circuit such as a CPU. That is, the head units 10-1 to 10-*n* can share the information indicating the abnormality in the drive voltage in any of the head units 10-1 to 10-*n* within a short time period. Therefore, it is possible to reduce the possibility that a loss of the medium due to a decrease in the quality of an image caused by instability in the amount of power supplied to the liquid ejection system 1 may occur and to reduce the possibility that a loss of ink due to unexpected ejection of the ink may occur.

5. Modifications

In the liquid ejection system 1 described above, the head units 10-1 to 10-*n* are electrically coupled to each other using the cables 5-1 to 5-(*n*−1). However, when the head units 10-1 to 10-*n* are electrically coupled to each other using connectors with a shape compliant with the USB standard, the same operational effects as described above are obtained. Therefore, the connectors CN1 included in the head units 10-1 to 10-*n* may be USB receptacle connectors with a shape compliant with the USB standard, the connectors CN2 included in the head units 10-1 to 10-*n* may be USB plugs with a shape compliant with the USB standard, and the connectors CN2 included in the head units 10-1 to 10-(*n*−1) may be fitted to the connectors CN1 included in the head units 10-2 to 10-*n*, respectively, such that the head units 10-1 to 10-*n* are electrically coupled to each other and are able to communicate with each other. That is, the head unit 10-1 may be electrically coupled to the head unit 10-2 by fitting the connector CN2-1 to the connector CN1-2. When this configuration is used, the same operational effects as described above in the embodiment are obtained, the fixing jigs or the like for fixing the head units 10-1, 10-2, . . . , and 10-*n* are not required, and the possibility that the configuration of the liquid ejection system 1 may be complex is further reduced.

In addition, in the liquid ejection system 1 described above, the head units 10-1 to 10-*n* are electrically coupled to each other using the cables 3-1 to 3-(*n*−1) such that the head units 10-1 to 10-*n* can share abnormality information of an abnormality that occurred in any of the head units 10-1 to 10-*n*. However, it suffices for the head units 10-1 to 10-*n* to be electrically coupled to each other such that the head units 10-1 to 10-*n* can share abnormality information of an abnormality that occurred in any of the head units 10-1 to 10-*n*. Therefore, the head unit 10-*i* may be electrically coupled to the head unit 10-(*i*+1) by directly fitting the terminal TM1 included in the head unit 10-*i* to the terminal TM2 included in the head unit 10-(*i*+1) without using the cable 3-*i*. Therefore, the terminals TM1 included in the head units 10-1 to 10-(*n*−1) and the terminals TM2 included in the head units 10-2 to 10-*n* may be included in so-called board-to-board connectors (B-to-B connectors) directly coupling the wiring substrates 14-1 to 14-(*n*−1) to the wiring substrates 14-2 to 14-*n*. In this case, the terminals TM1 and TM2 included in each of the head units 10-1 to 10-*n* may be provided in different connectors. When this configuration is used, the same operational effects as described above in the embodiment are obtained, the fixing jigs or the like for fixing the head unit 10-1, 10-2, . . . , and 10-*n* are not required, and the possibility that the configuration of the liquid ejection system 1 may be complex is further reduced.

In addition, in the liquid ejection system 1 according to the present embodiment, even when the liquid ejection system 1 includes the plurality of head units 10 as described above, it is possible to reduce the possibility that the quality of an image formed on the medium may decrease due to instability in the amount of power supplied to the liquid ejection system 1 and it is possible to reduce the possibility that a loss of the medium due to a decrease in the quality of an image may occur and to reduce the possibility that a loss of ink due to unexpected ejection of the ink from the ejecting heads 20 may occur. Therefore, a drive voltage for driving the liquid ejection system 1 is not limited to the drive voltage supplied from the host computer such as a personal computer, a tablet, or a smartphone and may be supplied from a battery such as a lead-acid storage battery, a nickel-cadmium storage battery, a metallic lithium battery, or a lithium-ion secondary battery that has lower output power than that of the host computer. In other words, a drive voltage output from the battery may be input as the voltage signal Vdd to the connector CN1 included in the head unit 10-1. Even when this configuration is used, the same operational effects as described above in the embodiment can be obtained. When the drive voltage is supplied to the liquid ejection system 1 from the battery such as a lead-acid storage battery, a nickel-cadmium storage battery, a metallic lithium battery, or a lithium-ion secondary battery, the image data including information of the image to be formed on the medium by the liquid ejection system 1 may be supplied to the liquid ejection system 1 by, for example, near-field communication or may be stored in a storage unit (not illustrated) included in the liquid ejection system 1 in advance.

In addition, in the above-described liquid ejection system 1 according to the present embodiment, each of the power supply abnormality determining circuits 110 detects voltage values of voltage signals Vdd1 and Vdd2 and determines whether the voltage values of the voltage signals Vdd1 and Vdd2 are normal. However, each of the power supply abnormality determining circuits 110 may detect the value of a current generated when the voltage signals Vdd1 and Vdd2 are transferred, and may determine, based on the detected current value, whether the voltage values of the voltage signals Vdd1 and Vdd2 are normal. That is, the power supply abnormality determining circuits 110-1 to **110-*n* may determine, based on values of currents generated when the voltage signals Vdd1-1 to 1-*n* and Vdd2-1 to Vdd2-*n* are transferred in the head units 10-1 to 10-*n*, whether the voltage signals Vdd1-1 to 1-*n* and Vdd2-1 to 2-*n*** are normal.

Figure 14:
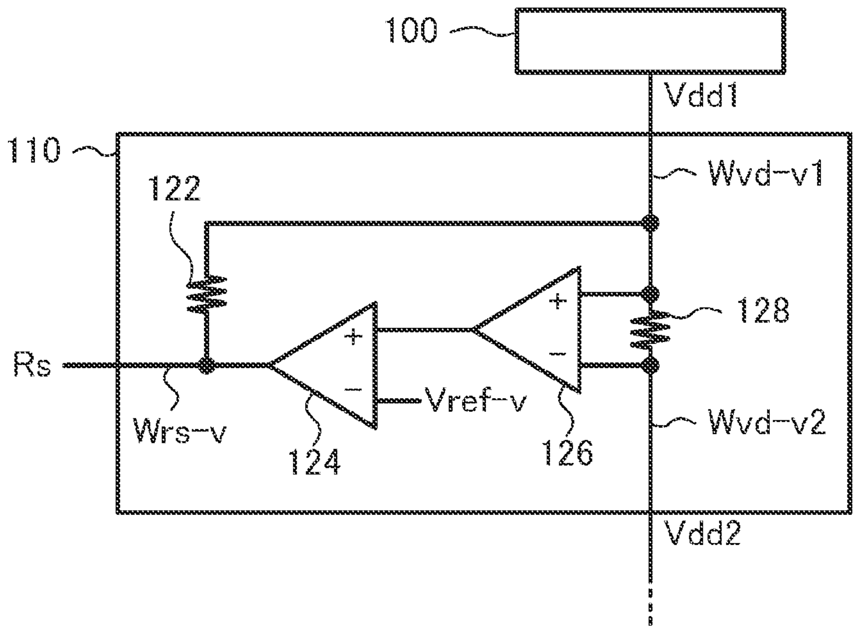
FIG. 14 is a diagram illustrating an example of a functional configuration of a power supply abnormality determining circuit according to a modification.

An example of the above-described configuration is described below. FIG. 14 is a diagram illustrating an example of a functional configuration of a power supply abnormality determining circuit 110 according to a modification. As illustrated in FIG. 14, the power supply abnormality determining circuit 110 according to the modification includes wirings Wrs-v, Wvd-v1, and Wvd-v2, resistive elements 122 and 128, a comparator 124, and an operational amplifier 126.

One end of the resistive element 128 is electrically coupled to the wiring Wvd-v1, while the other end of the resistive element 128 is electrically coupled to the wiring Wvd-v2. A voltage signal Vdd1 input to the power supply abnormality determining circuit 110 is transferred through the wiring Wvd-v1, the resistive element 128, and the wiring Wvd-v2 and output as a voltage signal Vdd2. The one end of the resistive element 128 is also electrically coupled to a positive-side input terminal of the operational amplifier 126, while the other end of the resistive element 128 is also electrically coupled to a negative-side input terminal of the operational amplifier 126. That is, a voltage applied between both ends of the resistive element 128 and defined by both of the amount of a current generated when the voltage signal Vdd1 is transferred in the wiring Wvd-v1, the resistive element 128, and the wiring Wvd-v2 and a resistance value of the resistive element 128 is input to the operational amplifier 126. Thereafter, the operational amplifier 126 outputs, from an output terminal of the operational amplifier 126, a voltage obtained by amplifying the voltage input to the operational amplifier 126. That is, the operational amplifier 126 outputs, from the output terminal, a signal having a voltage value according to the amount of the current generated when the voltage signal Vdd1 is transferred in the wiring Wvd-v1, the resistive element 128, and the wiring Wvd-v2.

One end of the resistive element 122 is electrically coupled to the wiring Wvd-v1, while the other end of the resistive element 122 is electrically coupled to the wiring Wrs-v. The signal having the voltage value according to the amount of the current generated when the voltage signal Vdd1 is transferred in the wiring Wvd-v1, the resistive element 128, and the wiring Wvd-v2 is output from the output terminal of the operational amplifier 126 and input to a positive-side input terminal of the comparator 124. A voltage signal Vref-v functioning as a reference voltage is input to a negative-side input terminal of the comparator 124. An output terminal of the comparator 124 is electrically coupled to the wiring Wrs-v. The power supply abnormality determining circuit 110 outputs a voltage value of the wiring Wrs-v as a determination result signal Rs.

In the power supply abnormality determining circuit 110 configured in the above-described manner, the comparator 124 compares the voltage value of the signal input to the positive-side input terminal of the comparator 124 and having the voltage value according to the amount of the current generated when the voltage signal Vdd1 is transferred in the wiring Wvd-v1, the resistive element 128, and the wiring Wvd-v2 with the voltage value of the voltage signal Vref-v input to the negative-side input terminal of the comparator 124. Thereafter, according to a result of the comparison of the voltage value of the signal having the voltage value according to the amount of the current generated when the voltage signal Vdd1 is transferred in the wiring Wvd-v1, the resistive element 128, and the wiring Wvd-v2 with the voltage value of the voltage signal Vref-v, the comparator 124 switches whether to set impedance of the output terminal of the comparator 124 to high impedance or set the output terminal of the comparator 124 to the ground potential.

In the power supply abnormality determining circuit 110 configured in the above-described manner, when the voltage value of the signal having the voltage value according to the amount of the current generated when the voltage signal Vdd1 is transferred in the wiring Wvd-v1, the resistive element 128, and the wiring Wvd-v2 is equal to or larger than the voltage value of the voltage signal Vref-v, that is, when the amount of the current generated when the voltage signal Vdd1 is transferred in the wiring Wvd-v1, the resistive element 128, and the wiring Wvd-v2 is equal or larger than a predetermined threshold value, the comparator 124 sets the impedance of the output terminal of the comparator 124 to the high impedance. In this case, a signal that has the voltage value of the signal transferred through the resistive element 122 and the wiring Wvd-v1, that is, has voltage values of the voltage signals Vdd1 and Vdd2 is supplied to the wiring Wrs-v electrically coupled to the output terminal of the comparator 124. Therefore, the power supply abnormality determining circuit 110 outputs the determination result signal Rs having the voltage value of the signal transferred through the wiring Wvd-v1.

On the other hand, when the voltage value of the signal having the voltage value according to the amount of the current generated when the voltage Vdd1 is transferred in the wiring Wvd-v1, the resistive element 128, and the wiring Wvd-v2 is smaller than the voltage value of the voltage signal Vref-v, that is, when the amount of the current generated when the voltage signal Vdd1 is transferred in the wiring Wvd-v1, the resistive element 128, and the wiring Wvd-v2 is smaller than the predetermined threshold value, the comparator 124 sets the output terminal to the ground potential. As a result, the potential of the wiring Wrs-v electrically coupled to the output terminal of the comparator 124 becomes the ground potential. That is, the power supply abnormality determining circuit 110 outputs the determination result signal Rs at the ground potential.

Even when the liquid ejection system 1 includes power supply abnormality determining circuits 110 having the same configuration as that of the power supply abnormality determining circuit 110 according to the modification, the same operational effects as described above in the embodiment are obtained.

Although the embodiments and the modifications are described above, the present disclosure is not limited to the embodiments and can be implemented in various forms without departing the gist of the present disclosure. For example, the embodiments described above can be appropriately combined.

The present disclosure includes a configuration (for example, a configuration in which functions, methods, and results are the same as those described in the embodiment, or a configuration in which purposes and effects are the same as those described in the embodiment) that is substantially the same as the configuration described in the embodiment. In addition, the present disclosure includes a configuration in which nonessential portions of the configuration described in the embodiment are replaced with other portions. In addition, the present disclosure includes a configuration in which the same operational effects as those of the configuration described in the embodiment are obtained or a configuration in which the same purposes as those of the configuration described in the embodiment are achieved. In addition, the present disclosure includes a configuration obtained by adding a known technique to the configuration described in the embodiment.

The following details are derived from the embodiments described above.

According to a first aspect, a liquid ejection system includes a first head unit that ejects liquid onto a medium, and a second head unit that ejects liquid onto the medium. The first head unit includes a first USB connector to which a first power supply voltage is input; a second USB connector from which a second power supply voltage based on the first power supply voltage is output; a first determining circuit that determines whether the first power supply voltage is normal; a first drive circuit that outputs a first drive signal based on the first power supply voltage; a first ejecting head that ejects the liquid when the first drive signal is supplied to the first ejecting head; and a first casing housing the first USB connector, the second USB connector, the first determining circuit, the first drive circuit, and the first ejecting head in a state in which at least a portion of the first USB connector and at least a portion of the second USB connector are exposed from the first casing. The second head unit includes a third USB connector to which the second power supply voltage is input; a second determining circuit that determines whether the second power supply voltage is normal; a second drive circuit that outputs a second drive signal based on the second power supply voltage; a second ejecting head that ejects the liquid when the second drive signal is supplied to the second ejecting head; and a second casing housing the third USB connector, the second determining circuit, the second drive circuit, and the second ejecting head in a state in which at least a portion of the third USB connector is exposed from the second casing. When the first determining circuit determines that the first power supply voltage is not normal, or when the second determining circuit determines that the second power supply voltage is not normal, the first ejecting head and the second ejecting head stop ejecting the liquid.

According to this liquid ejection system, when the first determining circuit determines that the first power supply voltage is not normal, or when the second determining circuit determines that the second power supply voltage is not normal, the first ejecting head and the second ejecting head stop ejecting the liquid so as to reduce the possibility that an image with low quality may be formed on the medium when the amount of power supplied to the liquid ejection system is unstable. As a result, even in the liquid ejection system having the plurality of head units, the possibility that a loss of the medium a decrease in the quality of an image may occur and the possibility that a loss of liquid due to unexpected ejection of the liquid may occur are reduced. Therefore, it is possible to provide the liquid ejection system that reduces the possibility that the quality of an image formed on the medium may decrease, and that reduces an environmental load.

According to a second aspect, in the liquid ejection system according to the first aspect, the drive circuit may include a modulating circuit that outputs a modulated signal obtained by modulating a base drive signal on which the first drive signal is based, an amplifying circuit that outputs an amplified modified signal obtained by amplifying the modulated signal, a level shifting circuit that outputs a level-shifted amplified modulated signal obtained by level-shifting a reference potential of the amplified modulated signal, and a demodulating circuit that demodulates the level-shifted amplified modulated signal so as to obtain the first drive signal and outputs the first drive signal.

According to this liquid ejection system, it is possible to reduce power consumption of the first drive circuit. Therefore, the possibility that the amount of power supplied in the liquid ejection system having the plurality of head units may become insufficient and unstable is reduced. Therefore, even in the liquid ejection system having the plurality of head units, the possibility that a loss of the medium due to a decrease in the quality of an image may occur and the possibility that a loss of liquid due to unexpected ejection of the liquid may occur are reduced.

According to a third aspect, in the liquid ejection system according to the first aspect, the first head unit may include a first terminal from which a first determination result signal indicating a result of the determination by the first determining circuit as to whether the first power supply voltage is normal is output, the second head unit may include a second terminal from which a second determination result signal indicating a result of the determination by the second determining circuit as to whether the second power supply voltage is normal is output, and the first head unit may be electrically coupled to the second head unit via the first terminal and the second terminal.

According to a fourth aspect, in the liquid ejection system according to the third aspect, a first wiring through which the first determination result signal is transferred and a second wiring through which the second determination result signal is transferred may be coupled in a wired-OR connection.

According to this liquid ejection system, in the liquid ejection system having the plurality of head units, the plurality of head units can share the determination result signals with each other without a processor such as a CPU. Therefore, the determination result signals can be shared within a short time period. As a result, in the liquid ejection system having the plurality of head units, the possibility that a loss of the medium due to a decrease in the quality of an image may occur and the possibility that a loss of liquid due to unexpected ejection of the liquid may occur can be further reduced.

According to a fifth aspect, in the liquid ejection system according to the fourth aspect, the first head unit may be electrically coupled to the second head unit by fitting the first terminal to the second terminal.

According to this liquid ejection system, in the liquid ejection system having the plurality of head units, it is not necessary to individually provide a configuration for fixing the plurality of head units to each other and a configuration for electrically coupling the plurality of head units to each other, and the possibility that the configuration of the liquid ejection system may be complex is reduced.

According to a sixth aspect, in the liquid ejection system according to the fourth aspect, the first head unit may be electrically coupled to the second head unit by coupling the first terminal to the second terminal via a cable.

According to a seventh aspect, in the liquid ejection system according to the first aspect, the first power supply voltage output from a battery may be input to the first USB connector.

According to this liquid ejection system, when the first determining circuit determines that the first power supply voltage is not normal, or when the second determining circuit determines that the second power supply voltage is not normal, the first ejecting head and the second ejecting head stop ejecting the liquid. Therefore, even when the amount of power supplied from the battery is unstable, in the liquid ejection system having the plurality of head units, it is possible to reduce the possibility that a loss of the medium due to a decrease in the quality of an image may occur and to reduce the possibility that a loss of liquid due to unexpected ejection of the liquid may occur.

According to an eighth aspect, in the liquid ejection system according to the first aspect, the first power supply voltage output by a host computer may be input to the first USB connector.

According to this liquid ejection system, when the first determining circuit determines that the first power supply voltage is not normal, or when the second determining circuit determines that the second power supply voltage is not normal, the first ejecting head and the second ejecting head stop ejecting the liquid. Therefore, even when a voltage is supplied from a host computer in which the amount of power is defined according to the USB standard, it is possible to reduce the possibility that a loss of the medium due to a decrease in the quality of an image may occur and to reduce the possibility that a loss of liquid due to unexpected ejection of the liquid may occur in the liquid ejection system having the plurality of head units.

According to a ninth aspect, in the liquid ejection system according to the first aspect, the first determining circuit may determine, based on a value of the first power supply voltage, whether the first power supply voltage is normal.

According to a tenth aspect, in the liquid ejection system according to the first aspect, the first determining circuit may determine, based on a value of a current generated when the first power supply voltage is transferred in the first head unit, whether the first power supply voltage is normal.

What is claimed is:

1. A liquid ejection system comprising:

a first head unit that ejects liquid onto a medium; and a second head unit that ejects liquid onto the medium, wherein the first head unit includes a first USB connector to which a first power supply voltage is input, a second USB connector from which a second power supply voltage based on the first power supply voltage is output, a first determining circuit that determines whether the first power supply voltage is normal, a first drive circuit that outputs a first drive signal based on the first power supply voltage, a first ejecting head that ejects the liquid when the first drive signal is supplied to the first ejecting head, and a first casing housing the first USB connector, the second USB connector, the first determining circuit, the first drive circuit, and the first ejecting head in a state in which at least a portion of the first USB connector and at least a portion of the second USB connector are exposed from the first casing, the second head unit includes a third USB connector to which the second power supply voltage is input, a second determining circuit that determines whether the second power supply voltage is normal, a second drive circuit that outputs a second drive signal based on the second power supply voltage, a second ejecting head that ejects the liquid when the second drive signal is supplied to the second ejecting head, and a second casing housing the third USB connector, the second determining circuit, the second drive circuit, and the second ejecting head in a state in which at least a portion of the third USB connector is exposed from the second casing, and when the first determining circuit determines that the first power supply voltage is not normal, or when the second determining circuit determines that the second power supply voltage is not normal, the first ejecting head and the second ejecting head stop ejecting the liquid.

2. The liquid ejection system according to claim 1, wherein the first drive circuit includes a modulating circuit that outputs a modulated signal obtained by modulating a base drive signal on which the first drive signal is based, an amplifying circuit that outputs an amplified modulated signal obtained by amplifying the modulated signal, a level shifting circuit that outputs a level-shifted amplified modulated signal obtained by level-shifting a reference potential of the amplified modulated signal, and a demodulating circuit that demodulates the level-shifted amplified modulated signal so as to obtain the first drive signal and outputs the first drive signal.

3. The liquid ejection system according to claim 1, wherein the first head unit includes a first terminal from which a first determination result signal indicating a result of the determination by the first determining circuit as to whether the first power supply voltage is normal is output, the second head unit includes a second terminal from which a second determination result signal indicating a result of the determination by the second determining circuit as to whether the second power supply voltage is normal is output, and the first head unit is electrically coupled to the second head unit via the first terminal and the second terminal.

4. The liquid ejection system according to claim 3, wherein a first wiring through which the first determination result signal is transferred and a second wiring through which the second determination result signal is transferred are coupled in a wired-OR connection.

5. The liquid ejection system according to claim 4, wherein the first head unit is electrically coupled to the second head unit by fitting the first terminal to the second terminal.

6. The liquid ejection system according to claim 4, wherein the first head unit is electrically coupled to the second head unit by coupling the first terminal to the second terminal via a cable.

7. The liquid ejection system according to claim 1, wherein the first power supply voltage output from a battery is input to the first USB connector.

8. The liquid ejection system according to claim 1, wherein the first power supply voltage output by a host computer is input to the first USB connector.

9. The liquid ejection system according to claim 1, wherein the first determining circuit determines, based on a value of the first power supply voltage, whether the first power supply voltage is normal.

10. The liquid ejection system according to claim 1, wherein the first determining circuit determines, based on a value of a current generated when the first power supply voltage is transferred in the first head unit, whether the first power supply voltage is normal.

* * * * *